(12) United States Patent
Nishimura et al.

(10) Patent No.: US 7,953,985 B2
(45) Date of Patent: May 31, 2011

(54) MEMORY CARD, APPLICATION PROGRAM HOLDING METHOD, AND HOLDING PROGRAM

(75) Inventors: Yoshiko Nishimura, Hiroshima (JP); Kazuyuki Kashiwabara, Hiroshima (JP); Eiji Kawahara, Hiroshima (JP)

(73) Assignee: Panasonic Corporation, Osaka (JP)

( * ) Notice: Subject to any disclaimer, the term of this patent is extended or adjusted under 35 U.S.C. 154(b) by 884 days.

(21) Appl. No.: 11/912,351

(22) PCT Filed: Apr. 28, 2006

(86) PCT No.: PCT/JP2006/308976
§ 371 (c)(1),
(2), (4) Date: Oct. 23, 2007

(87) PCT Pub. No.: WO2006/120938
PCT Pub. Date: Nov. 16, 2006

(65) Prior Publication Data
US 2009/0070599 A1    Mar. 12, 2009

(30) Foreign Application Priority Data
May 9, 2005 (JP) ................................. 2005-136101

(51) Int. Cl.
*G06F 11/30* (2006.01)
*G06F 12/14* (2006.01)
(52) U.S. Cl. ........ 713/193; 713/194; 713/189; 711/100; 711/162; 711/156
(58) Field of Classification Search .................... None
See application file for complete search history.

(56) References Cited

U.S. PATENT DOCUMENTS

| 7,162,645 B2 | 1/2007 | Iguchi et al. |
| 7,370,222 B2 * | 5/2008 | Kaiya et al. ................... 714/2 |

(Continued)

FOREIGN PATENT DOCUMENTS

EP    1 450 235    8/2004

(Continued)

OTHER PUBLICATIONS

International Search Report issued Aug. 8, 2006 in the International (PCT) Application of which the present application is the U.S. National Stage.

*Primary Examiner* — Nasser Moazzami
*Assistant Examiner* — Fikremariam Yalew
(74) *Attorney, Agent, or Firm* — Wenderoth, Lind & Ponack, L.L.P.

(57) ABSTRACT

A memory card receives an encrypted application program from a host apparatus. The memory card includes an Integrated Circuit (IC) card unit having a tamper resistant function, and a flash memory unit. The IC card unit also includes a tamper resistant storage unit, a program acquisition unit that acquires the encrypted application program from the host apparatus, a storage control unit which stores the acquired encrypted application program in the tamper resistant storage unit or the flash memory unit, and a move control unit. The memory control unit, when the application program stored in the tamper resistant storage unit is to be executed and the size of the application program to be executed in the decrypted form exceeds the size of free space of the tamper resistant storage unit, moves an arbitrary encrypted application program stored in the tamper resistant storage unit to the flash memory unit.

11 Claims, 22 Drawing Sheets

U.S. PATENT DOCUMENTS

| | | |
|---|---|---|
| 2003/0182569 A1* | 9/2003 | Matsuzaki et al. ............ 713/193 |
| 2004/0123122 A1 | 6/2004 | Asai et al. |
| 2004/0165413 A1* | 8/2004 | Takagi et al. ................. 365/148 |

FOREIGN PATENT DOCUMENTS

| | | |
|---|---|---|
| JP | 2002-229861 | 8/2002 |
| JP | 2003-337749 | 11/2003 |
| JP | 2004-252707 | 9/2004 |
| JP | 2005-018725 | 1/2005 |
| WO | 03-077083 | 9/2003 |
| WO | 2004/013744 | 2/2004 |

* cited by examiner

FIG. 6

| PROGRAM ID | LAST ACCESS DATE | SECOND-LAST ACCESS DATE | ACCESS INTERVAL |
|---|---|---|---|
| 0x0001 | 20041231 | 20041230 | 1 |
| 0x0002 | 20050124 | 20040124 | 365 |
| 0x0003 | 20050210 | 20050203 | 7 |
| 0x0004 | 20050205 | 20050105 | 30 |
| --- | --- | --- | --- |
| --- | --- | --- | --- |

| PROGRAM ID | STORAGE LOCATION | DATA SIZE IN ENCRYPTED FORM | DATA SIZE IN DECRYPTED FORM | MOVE FLAG | DECRYPTION FLAG |
|---|---|---|---|---|---|
| 0x0001 | TRM | 10KB | 30KB | 0 | 0 |
| 0x0002 | MASS STORAGE NONVOLATILE MEMORY | 30KB | 50KB | 0 | 0 |
| 0x0003 | TRM | 40KB | 70KB | 1 | 1 |
| 0x0004 | TRM | 20KB | 40KB | 0 | 0 |
| --- | --- | --- | --- | --- | --- |

| APPLICATION PROGRAM | PROGRAM ID | DATA SIZE IN ENCRYPTED FORM | DATA SIZE IN DECRYPTED FORM |
|---|---|---|---|
| A | 0x0001 | 10KB | 30KB |
| B | 0x0002 | 30KB | 50KB |
| C | 0x0003 | 40KB | 70KB |

| PROGRAM ID | STORAGE LOCATION | DATA SIZE IN ENCRYPTED FORM | DATA SIZE IN DECRYPTED FORM | MOVE FLAG | DECRYPTION FLAG |
|---|---|---|---|---|---|
| 0x0001 | TRM | 10KB | 30KB | 0 | 0 |

PROGRAM A (ENCRYPTED) — 10KB

FREE SPACE — 110KB

| PROGRAM ID | STORAGE LOCATION | DATA SIZE IN ENCRYPTED FORM | DATA SIZE IN DECRYPTED FORM | MOVE FLAG | DECRYPTION FLAG |
|---|---|---|---|---|---|
| 0x0001 | TRM | 10KB | 30KB | 0 | 0 |
| 0x0002 | TRM | 30KB | 50KB | 0 | 0 |
| 0x0002 | TRM | 30KB | 50KB | 0 | 1 |

~1500

| PROGRAM A (ENCRYPTED) | PROGRAM B (ENCRYPTED) | PROGRAM B (DECRYPTED) | FREE SPACE |
|---|---|---|---|
| 10KB | 30KB | 50KB | 30KB |

| PROGRAM ID | STORAGE LOCATION | DATA SIZE IN ENCRYPTED FORM | DATA SIZE IN DECRYPTED FORM | MOVE FLAG | DECRYPTION FLAG |
|---|---|---|---|---|---|
| 0x0001 | TRM | 10KB | 30KB | 0 | 0 |
| 0x0002 | TRM | 30KB | 50KB | 0 | 0 |
| 0x0003 | TRM | 40KB | 70KB | 0 | 0 |

1600

| PROGRAM A (ENCRYPTED) | PROGRAM B (ENCRYPTED) | PROGRAM C (ENCRYPTED) | FREE SPACE |
|---|---|---|---|
| 10KB | 30KB | 40KB | 40KB |

| PROGRAM ID | STORAGE LOCATION | DATA SIZE IN ENCRYPTED FORM | DATA SIZE IN DECRYPTED FORM | MOVE FLAG | DECRYPTION FLAG |
|---|---|---|---|---|---|
| 0x0001 | TRM | 10KB | 30KB | 1 | 0 |
| 0x0002 | TRM | 30KB | 50KB | 0 | 0 |
| 0x0003 | TRM | 40KB | 70KB | 0 | 0 |

1700

PROGRAM B (ENCRYPTED) — 30KB
PROGRAM C (ENCRYPTED) — 40KB
FREE SPACE — 50KB

| PROGRAM ID | STORAGE LOCATION | DATA SIZE IN ENCRYPTED FORM | DATA SIZE IN DECRYPTED FORM | MOVE FLAG | DECRYPTION FLAG |
|---|---|---|---|---|---|
| 0x0001 | TRM | 10KB | 30KB | 1 | 0 |
| 0x0002 | TRM | 30KB | 50KB | 1 | 0 |
| 0x0003 | TRM | 40KB | 70KB | 0 | 0 |

1800

PROGRAM C (ENCRYPTED) — 40KB

FREE SPACE — 80KB

| PROGRAM ID | STORAGE LOCATION | DATA SIZE IN ENCRYPTED FORM | DATA SIZE IN DECRYPTED FORM | MOVE FLAG | DECRYPTION FLAG |
|---|---|---|---|---|---|
| 0x0001 | MASS STORAGE NONVOLATILE MEMORY | 10KB | 30KB | 0 | 0 |
| 0x0002 | MASS STORAGE NONVOLATILE MEMORY | 30KB | 50KB | 0 | 0 |
| 0x0003 | TRM | 40KB | 70KB | 0 | 0 |
| 0x0003 | TRM | 40KB | 70KB | 0 | 1 |

1900

PROGRAM C (ENCRYPTED) — 40KB
PROGRAM C (DECRYPTED) — 70KB
FREE SPACE — 10KB

| PROGRAM ID | STORAGE LOCATION | DATA SIZE IN ENCRYPTED FORM | DATA SIZE IN DECRYPTED FORM | MOVE FLAG | DECRYPTION FLAG |
|---|---|---|---|---|---|
| 0x0001 | MASS STORAGE NONVOLATILE MEMORY | 10KB | 30KB | 0 | 0 |
| 0x0002 | MASS STORAGE NONVOLATILE MEMORY | 30KB | 50KB | 0 | 0 |
| 0x0003 | TRM | 40KB | 70KB | 0 | 0 |

~2000

PROGRAM C (ENCRYPTED) — 40KB

FREE SPACE — 80KB

| PROGRAM ID | STORAGE LOCATION | DATA SIZE IN ENCRYPTED FORM | DATA SIZE IN DECRYPTED FORM | MOVE FLAG | DECRYPTION FLAG |
|---|---|---|---|---|---|
| 0x0001 | MASS STORAGE NONVOLATILE MEMORY | 10KB | 30KB | 0 | 0 |
| 0x0002 | TRM | 30KB | 50KB | 0 | 1 |
| 0x0003 | TRM | 40KB | 70KB | 0 | 0 |

2100

PROGRAM C (ENCRYPTED) — 40KB
PROGRAM B (DECRYPTED) — 50KB
FREE SPACE — 30KB

MEMORY CARD, APPLICATION PROGRAM HOLDING METHOD, AND HOLDING PROGRAM

BACKGROUND OF THE INVENTION

1. Technical Field

The present invention relates to a memory card which holds an application program.

2. Background Art

With the spread of secure memory cards including smart Secure Digital memory cards (referred to as the "SD cards" hereafter) equipped with Integrated Circuit (IC) card functions, the number of kinds of application programs to be used and the number of their users are expected to increase in the future.

FIG. 1(A) is a diagram showing a hardware construction of a common secure memory card. As shown in FIG. 1(A), a secure memory card 100 is composed of a Read Only Memory (ROM) 103, a Random Access Memory (RAM) 102, a Central Processing Unit (CPU) 104, and a nonvolatile memory group 101. The ROM 103 stores an application program. The RAM 102 temporarily stores data that is to be used when the application program is executed. The CPU 104 executes processes corresponding to various commands in accordance with the application program. The nonvolatile memory group 101 stores an application program that is downloaded from outside of the memory card.

The nonvolatile memory group 101 is made up of: a Ferroelectric RAM (FeRAM) 106 included in a tamper resistant module (TRM: Tamper Resistant Module) 107; a secure flash 108 provided outside of the TRM 107; and a flash memory 109 provided outside of the TRM 107. The secure flash 108 is a flash memory whose security level is raised using the function of the TRM 107.

FIG. 1(B) is a diagram showing the security levels of the three nonvolatile memories making up the nonvolatile memory group 101. As shown in FIG. 1(B), the security level of the FeRAM 106 included in the TRM 107 is the highest, followed by the second highest security level of the secure flash 108, and the security level of the flash memory 109 is the lowest.

An application program downloaded from a service provider is usually stored in the TRM 107 area. Since the capacity of the TRM 107 area is extremely smaller than the capacity of the flash memory 109, the user needs to erase an application program that is too large to be stored in the TRM 107 area.

With this being the situation, there is a need for a system that allows more application programs to be stored in a single secure memory card 100, not by erasing, but by moving the application program stored in the TRM 107 area to the flash memory 109 of the secure memory card 100 while maintaining the security level required by the service provider, and then by restoring the application program to the TRM 107 as needed.

Patent Reference 1 discloses the invention which allocates a storage area to an application program to be downloaded, in accordance with the security level of the application program.
Patent Reference 1: Japanese Laid-Open Patent Application No. 2002-229861

According to the conventional technique disclosed in Patent Reference 1, an application program to be downloaded is stored in either a TRM area or a flash memory when downloaded, depending on the security level of the application program. When the application program is to be stored in the flash memory, this application program which is downloaded in an encrypted form is decrypted first. The decrypted application program is then encrypted using a secret information key previously stored in the TRM area, and the encrypted application program is stored in the flash memory. To be more specific, according to the conventional technique, when the application program is stored in the flash memory whose security level is the lowest in the secure memory card, the application program is encrypted using the secret information key stored in the secure memory card. For this reason, the application program to be downloaded cannot be stored in the flash memory, while maintaining the security level required by the service provider which provides the application program.

An object of the present invention is to provide a memory card which stores an application program downloaded from a service provider in a flash memory, while maintaining a security level required by the service provider.

SUMMARY OF THE INVENTION

In order to achieve the above object, the memory card of the present invention is a memory card which receives an encrypted application program from a host apparatus, the encrypted application program being downloaded to the host apparatus, the memory card including: an Integrated Circuit (IC) card unit having a tamper resistant function; and a flash memory unit, wherein the IC card unit includes: a tamper resistant storage unit; a program acquisition unit which acquires, from the host apparatus, the encrypted application program and respective sizes of the application program in encrypted and decrypted forms; a storage control unit which selects one of the tamper resistant storage unit and the flash memory unit as a storage location area on the basis of the size of the acquired application program in the encrypted form and a size of free space of the tamper resistant storage unit, and stores the acquired encrypted application program in the selected storage location area; a move control unit which, when the application program stored in the tamper resistant storage unit is to be executed and the size of the to-be-executed application program in the decrypted form exceeds the size of the free space of the tamper resistant storage unit, moves an arbitrary encrypted application program stored in the tamper resistant storage unit to the flash memory unit; and an execution unit which decrypts and executes the to-be-executed application program.

With this, the memory card of the present invention can store an application program downloaded from a service provider in a flash memory, while maintaining a security level required by the service provider.

For example, when the size of the acquired application program in the encrypted form is equal to or smaller than the size of the free space of the tamper resistant storage unit, the storage control unit stores the application program in the tamper resistant storage unit, and when the size in the encrypted form exceeds the size of the free space, the storage control unit stores the application program in the flash memory unit.

For example, when the size of the acquired application program in the encrypted form exceeds the size of the free space of the tamper resistant storage unit, the storage control unit moves an arbitrary encrypted application program stored in the tamper resistant storage unit to the flash memory unit.

For example, the execution unit moves the to-be-executed encrypted application program to the flash memory unit after executing the application program.

For example, when the to-be-executed application program is stored in the flash memory unit and a total of the respective sizes of the to-be-executed application program in the encrypted and decrypted forms exceeds the size of the free space of the tamper resistant storage unit, the move control unit moves an arbitrary encrypted application program stored in the tamper resistant storage unit to the flash memory unit and copies the to-be-executed application program to the tamper resistant storage unit.

For example, when the to-be-executed application program is stored in the flash memory unit and the size of the to-be-executed application program in the decrypted form exceeds the size of the free space of the tamper resistant storage unit, the move control unit moves an arbitrary encrypted application program stored in the tamper resistant storage unit to the flash memory unit, and stores the to-be-executed application program in the tamper resistant storage unit after decrypting the to-be-executed application program.

For example, the move control unit may generate access history management information for each application program, on the basis of an execution history of the application program, and the IC card unit may further include a move judgment unit that determines which application program is to be moved to the flash memory unit, in accordance with the access history management information.

For example, the program acquisition unit may acquire information unique to the host apparatus, the IC card unit may further include: a key generation unit which generates an encryption key using the acquired information unique to the host apparatus; and an additional encryption unit which encrypts the application program to be moved from the tamper resistant storage unit to the flash memory unit, using the encryption key, and the move control unit may erase the encryption key after the encryption and move the to-be-moved application program which is doubly encrypted with the encryption key to the flash memory unit.

For example, the IC card unit may further include an additional decryption unit which, when the application program stored in the flash memory unit and doubly encrypted with the encryption key is copied to the tamper resistant storage unit, decrypts the to-be-copied application program using the encryption key generated by the key generation unit, and the move control unit may erase the encryption key after the decryption and store the to-be-copied application program in the tamper resistant storage unit.

The present invention can also be realized as: an application program holding method which has the characteristic components of the memory card as its steps; a holding program which causes a computer to execute these steps; and an integrated circuit which includes the above characteristic components. The stated holding program can be distributed via a recording medium such as a CD-ROM or via a transmission medium such as a communication network.

EFFECTS OF THE INVENTION

The present invention can provide a memory card which stores an application program downloaded from a service provider in a flash memory, while maintaining a security level required by the service provider.

The present invention allows many application programs to be stored in a single secure memory card while maintaining the security level required by the service provider.

BRIEF DESCRIPTION OF DRAWINGS

FIG. 6 is a diagram showing an example of history management information according to the first embodiment.

FIG. 7 is a diagram showing an example of program management information according to the first embodiment.

FIG. 12 is a diagram showing an example of information about application programs provided by a service provider, according to the first embodiment.

18(B) is a diagram showing a state of the RAM after the application program B is also determined to be moved in order for the application program C to be executed according to the first embodiment.

Figures 19A, 19B:
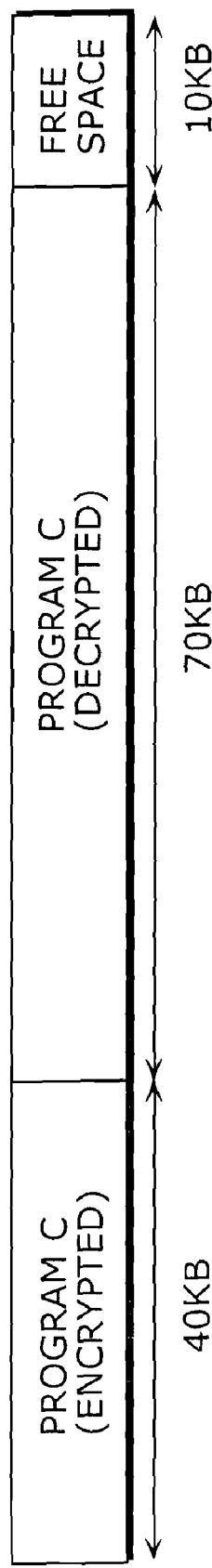

FIG. 19(A) is a diagram showing the program management information obtained after the application program A and the application program B are erased from the RAM in order for the application program C to be executed according to the first embodiment, and FIG. 19(B) is a diagram showing a state of the RAM after the application program A and the application program B are erased in order for the application program C to be executed according to the first embodiment.

Figures 20A, 20B:
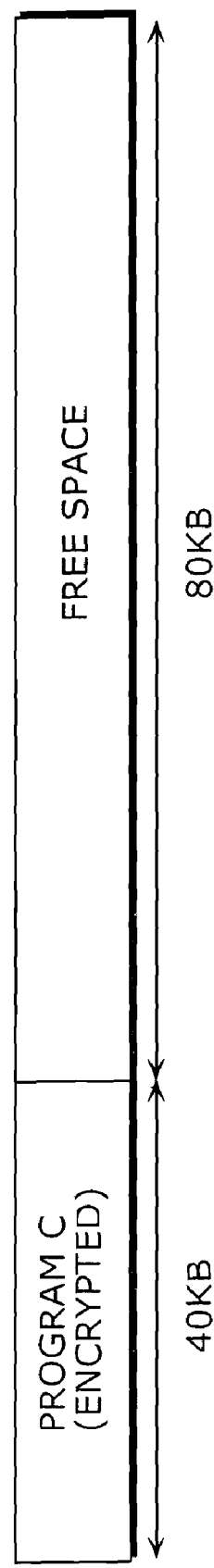

FIG. 20(A) is a diagram showing the program management information obtained after the application program C is erased from the RAM in order for the application program B to be executed according to the first embodiment, and FIG. 20(B) is a diagram showing a state of the RAM after the application program C is erased in order for the application program B to be executed according to the first embodiment.

Figures 21A, 21B:
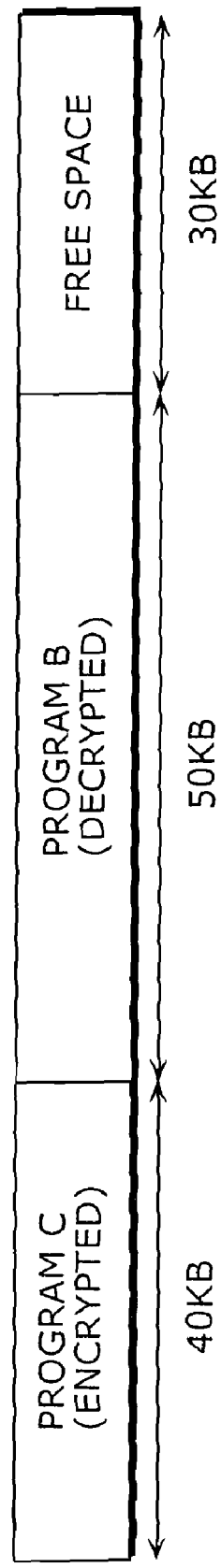

FIG. 21(A) is a diagram showing the program management information obtained after the execution of the application program B according to the first embodiment, and FIG. 21(B) is a diagram showing a state of the RAM after the execution of the application program B according to the first embodiment.

Figure 22:
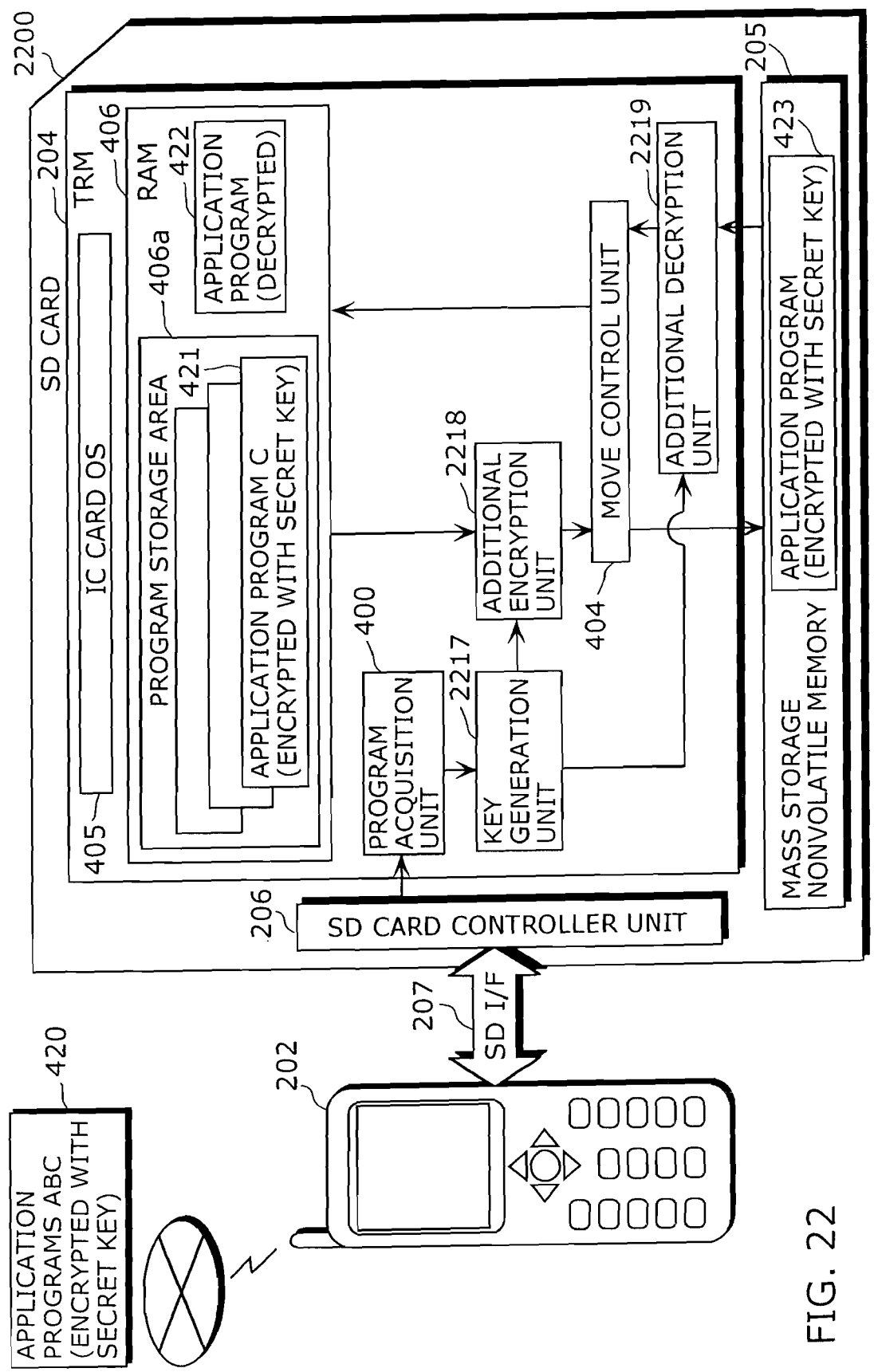

FIG. 22 is a block diagram of an SD card according to a second embodiment.

NUMERICAL REFERENCES 100 secure memory card
101 nonvolatile memory group
102 RAM
103 ROM
104 CPU
105 host interface
106 FeRAM
107 TRM
108 secure flash
109 flash memory
201 service provider
202 host apparatus
203 SD card
204 TRM
205 mass storage nonvolatile memory
206 SD card controller unit
207 SD interface
300 external CPU
301 secure memory card
302 control unit
303 internal CPU
304 TRM
305 mass storage nonvolatile memory
306 internal nonvolatile memory
307 secure area
308 authorized area
309 unauthorized area
400 program acquisition unit
401 program management unit
402 history management unit
403 storage control unit
404 move control unit
405 IC card OS
406 RAM
406a program storage area
407 public key storage unit
408 decryption unit
409 execution unit
410 reread unit
411 erase unit
420, 421, 422, 423 application programs
503 time information acquisition unit
505 move judgment unit
507 temporary storage unit
2200 SD card
2217 key generation unit
2218 additional encryption unit
2219 additional decryption unit

DETAILED DESCRIPTION OF THE INVENTION

The following is a description of the best mode for carrying out the present invention, with reference to the drawings.

First Embodiment

Figure 2:
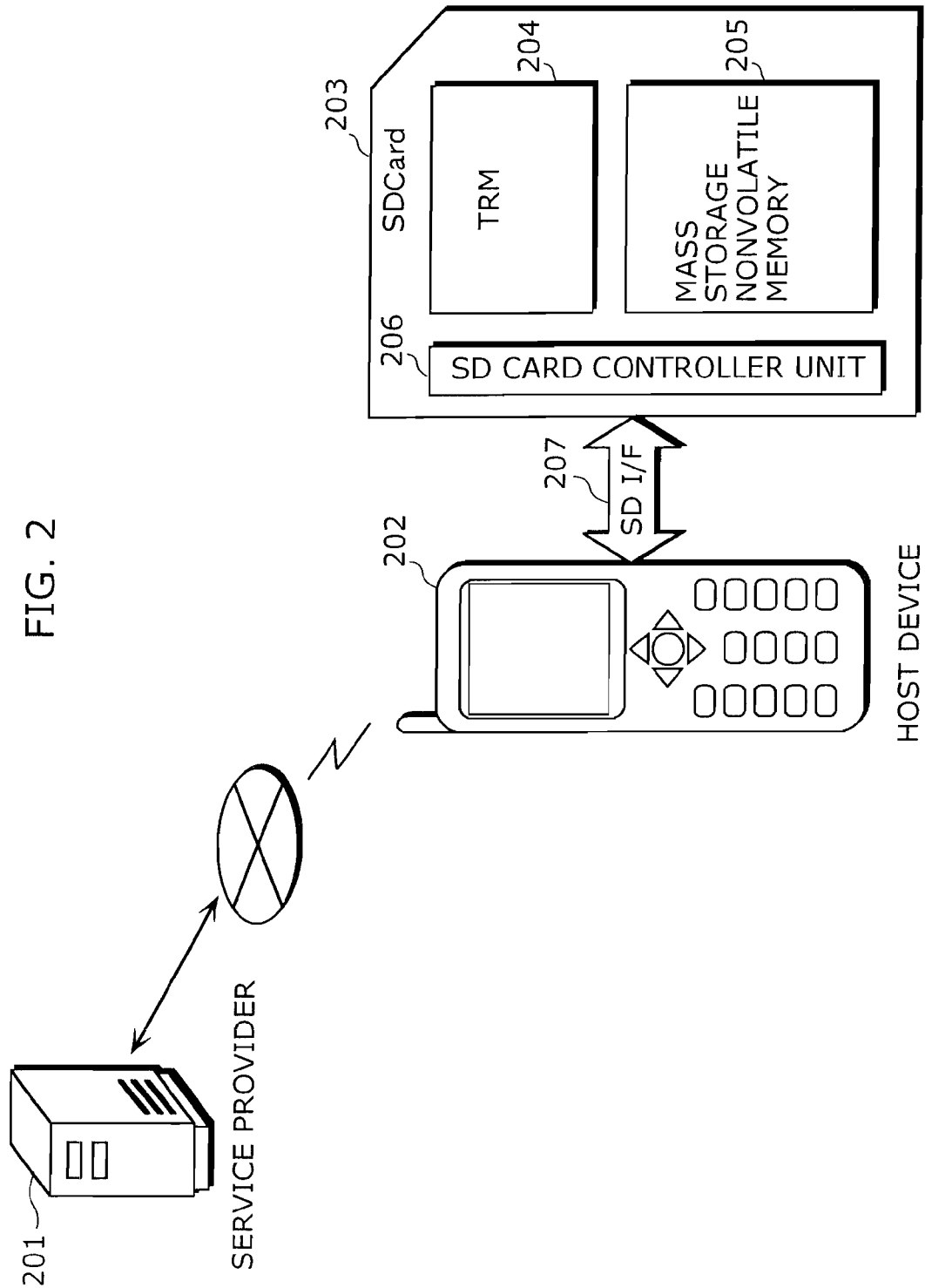
FIG. 2 is a diagram showing an overview of an entire system according to a first embodiment.

FIG. 2 shows an overview of an entire system according to the first embodiment. Suppose a case where a secure memory card is an SD card in the first embodiment.

As shown in FIG. 2, an SD card 203 of the first embodiment is connected to a host apparatus 202, such as a cellular phone, via an SD interface (referred to as the "SD I/F" hereafter) 207, and is composed of a tamper resistant module (TRM) 204, a mass storage nonvolatile memory 205, and an SD card controller unit 206. The host apparatus 202 is not limited to a cellular phone, and may be any kind of apparatus as long as it has an SD I/F.

Figure 3:
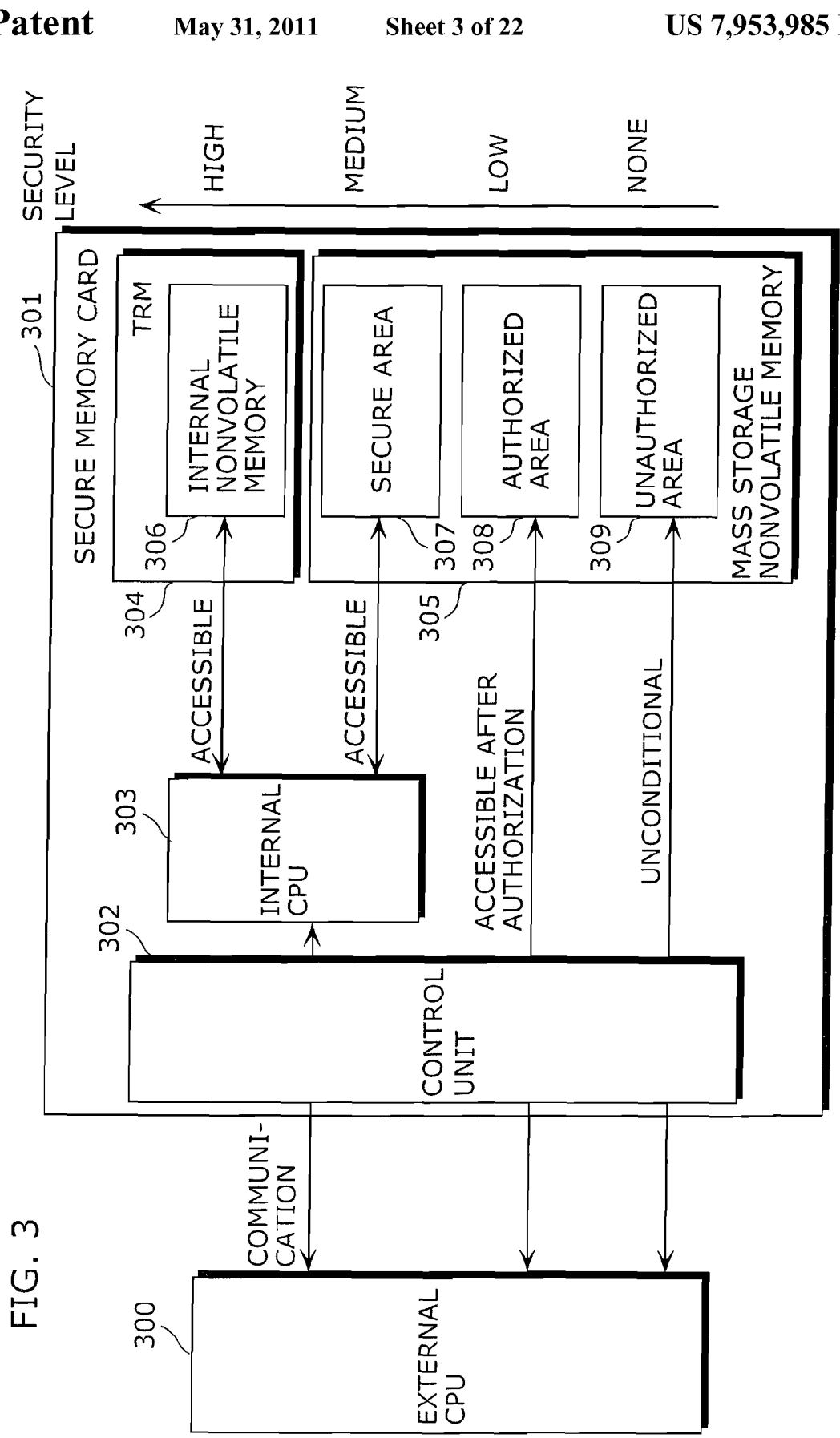
FIG. 3 is a diagram showing an overview of a common secure memory card.

FIG. 3 is a diagram showing an overview of a common secure memory card. As shown in FIG. 3, a secure memory card 301 is composed of: a TRM 304 which includes an internal nonvolatile memory 306; a mass storage nonvolatile memory 305 which includes a secure area 307, an authorized area 308, and an unauthorized area 309; an internal CPU 303 which accesses the internal nonvolatile memory 306 and the secure area 307; and a control unit 302 which performs authorization processing through communication with an external CPU 300 of an electronic apparatus (read/write(R/W) apparatus) and grants the authorized external CPU 300 permission to access the authorized area 308.

The internal nonvolatile memory 306 of the TRM 304 is, for example, an Electronically Erasable and Programmable ROM (EEPROM) which can erase or write data on a byte-by-byte basis. The mass storage nonvolatile memory 305 is, for example, a flash memory which can erase data in blocks, with the block size being 64 kilobytes for instance, and write data on a byte-by-byte basis.

The external CPU 300 can unconditionally access the unauthorized area 309. The external CPU 300 can access the authorized area 308 only when authorization by the control unit 302 is completed. However, the external CPU 300 has no way to know the existences of the secure area 307 and the internal nonvolatile memory 306, and thus cannot directly access them. Only the internal CPU 303 can access the secure area 307 and the internal nonvolatile memory 306.

A difference between the secure area 307 and the internal nonvolatile memory 306 is that the internal nonvolatile memory 306 is provided in the TRM 304 whereas the secure area 307 is provided in the mass storage nonvolatile memory 305 outside of the TRM 304. On account of this, although the secure area 307 is able to have a larger storage capacity than the internal nonvolatile memory 306 is, its security level is lower than that of the internal nonvolatile memory 306 provided in the TRM 304. According to the security levels of these four areas as shown in FIG. 3, the unauthorized area 309 has the lowest level, followed by the authorized area 308, the secure area 307, and then the internal nonvolatile memory 306 which has the highest level.

Figure 1A:
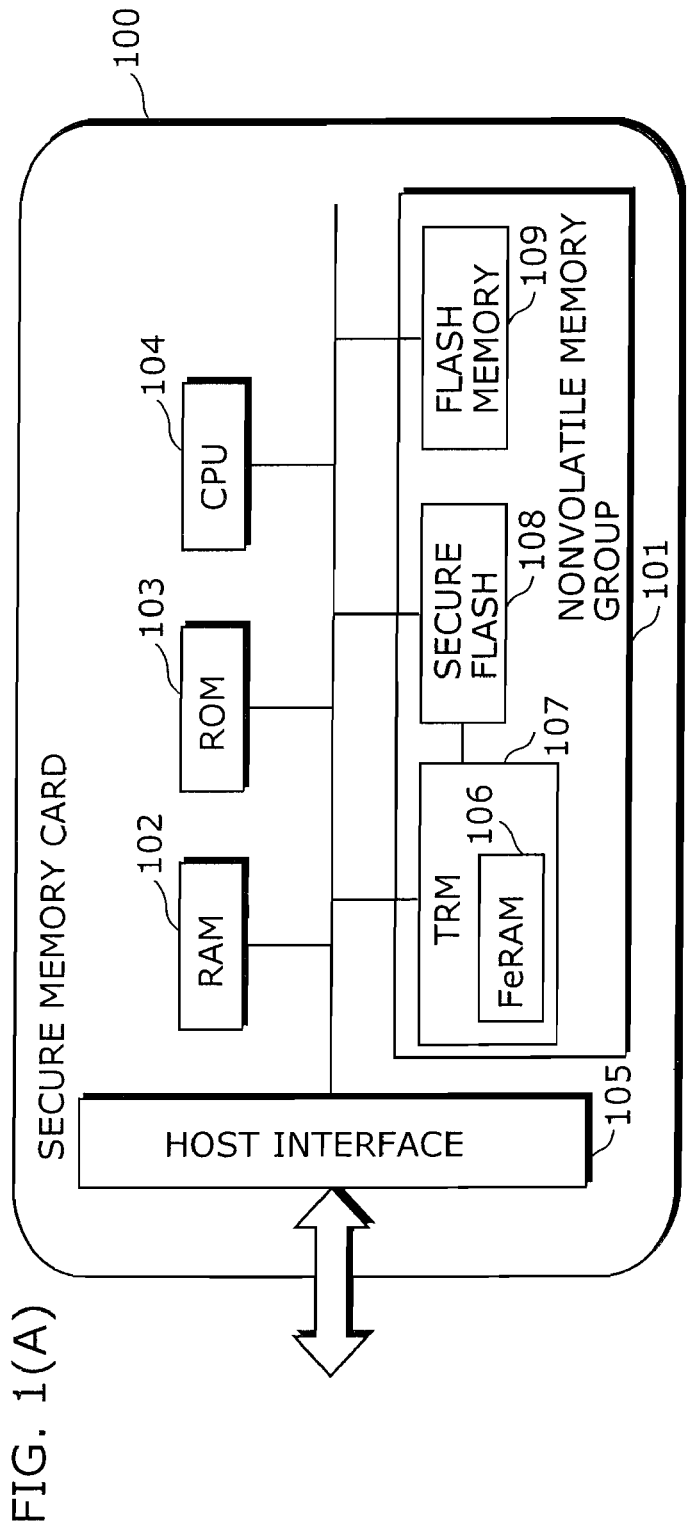
FIG. 1(A) is a diagram showing a hardware construction of a common secure memory card.
Figure 1B:
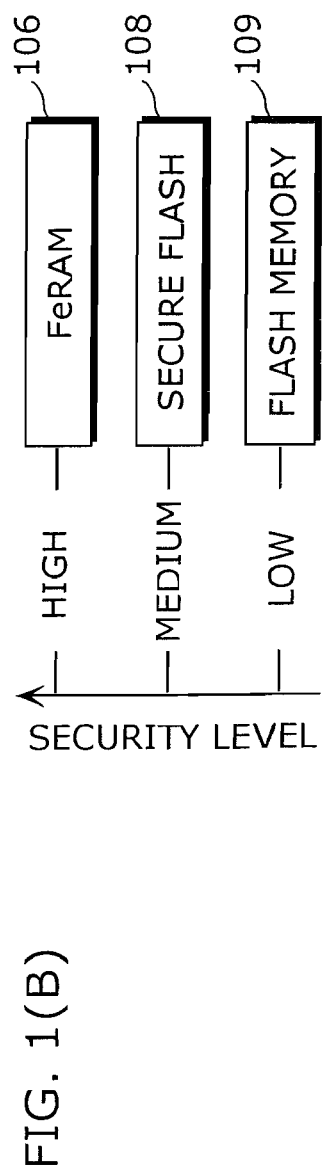
FIG. 1(B) is a diagram showing security levels of a FeRAM, a secure flash, and a flash memory which make up a nonvolatile memory group.

The correspondence between the nonvolatile memory group 101 shown in FIG. 1(A) and FIG. 3 is as follows: the FeRAM 106 in FIG. 1(A) corresponds to the internal nonvolatile memory 306 in FIG. 3; the secure flash 108 in FIG. 1(A) corresponds to the secure area 307 in FIG. 3; and the flash memory 109 in FIG. 1(A) corresponds to the authorized area 308 and the unauthorized area 309 in FIG. 3.

Figure 4:
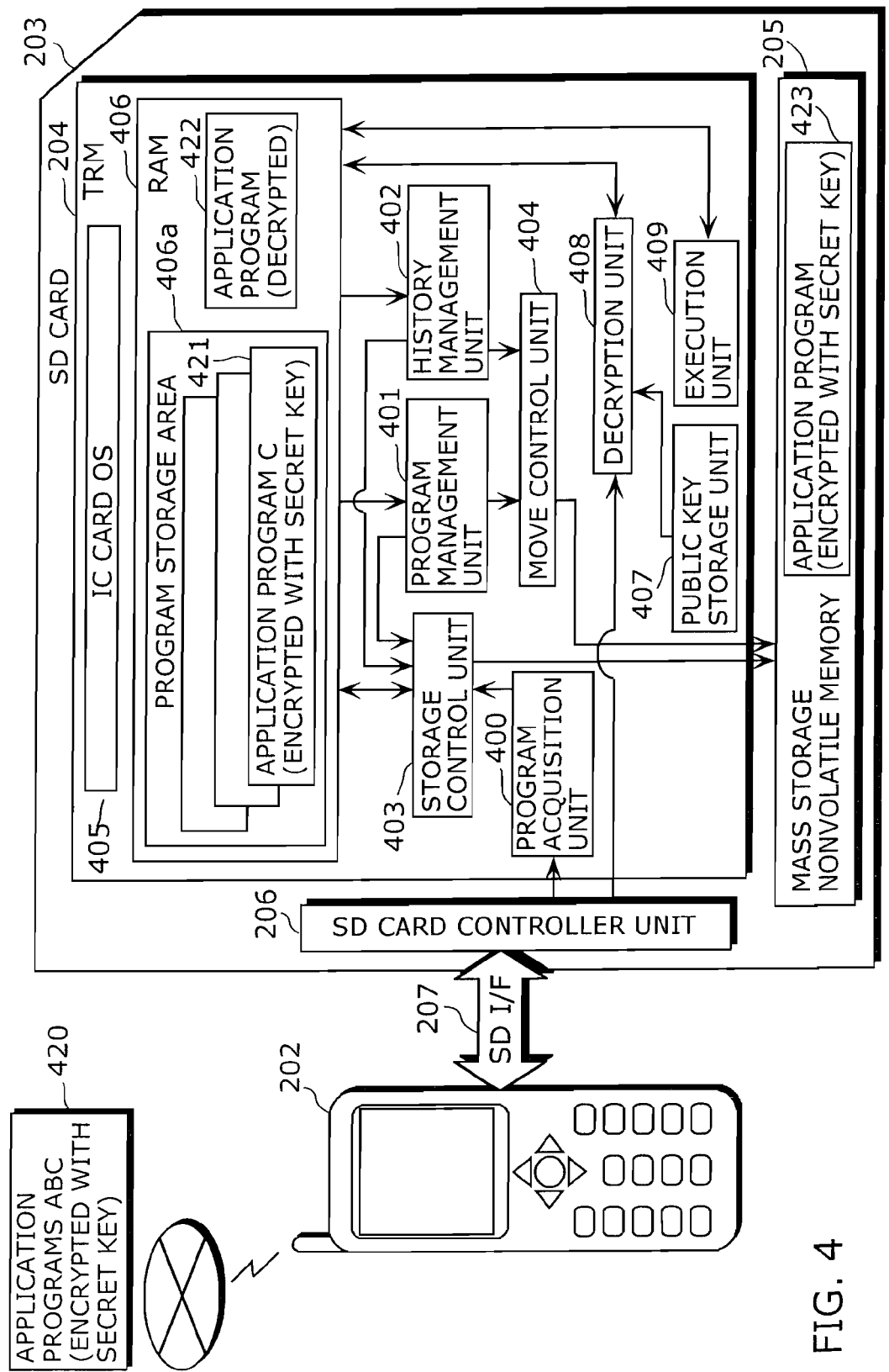
FIG. 4 is a block diagram of an SD card according to the first embodiment.

FIG. 4 is a block diagram of the SD card 203 according to the first embodiment. The SD card 203 is composed of: the SD card controller unit 206 defined by the SD standards; the TRM 204; and the mass storage nonvolatile memory 205. The SD card controller unit 206 is an interface unit which sends and receives data to and from the host apparatus 202. The TRM 204 is an IC card unit which is equipped with a tamper resistant function. As the mass storage nonvolatile memory 205, a flash memory can be used for example.

The TRM 204 includes a program acquisition unit 400, a program management unit 401, a history management unit 402, a storage control unit 403, a move control unit 404, an IC card Operating System (OS) 405, a RAM 406, a public key storage unit 407, a decryption unit 408, and an execution unit 409. Although the TRM 204 further includes a reread unit 410 and an erase unit 411, these units are not shown in FIG. 4. The reread unit 410 and the erase unit 411 will be described later with reference to FIG. 5.

The program acquisition unit 400 acquires an application program 420, which is downloaded from the service provider, via the SD card controller unit 206. The application program 420 to be downloaded is encrypted at a security level required by the service provider.

The program management unit 401 manages a program ID uniquely identifying an application program stored in the RAM 406 or the mass storage nonvolatile memory 205, and a storage location of the application program as well. The storage location of the application program is the RAM 406 or the mass storage nonvolatile memory 205.

The history management unit 402 manages an access history of the application program.

The storage control unit 403 stores the application program acquired by the program acquisition unit 400 in a program storage area 406a of the RAM 406.

The move control unit 404 moves a to-be-moved application program from the program storage area 406a of the RAM 406 to the mass storage nonvolatile memory 205.

The RAM 406 has the program storage area 406a which stores the application program downloaded from the host apparatus 202 as it is, meaning that the application program is stored in the encrypted form. The RAM 406 stores a decrypted application program as well. To be more specific, in addition to the program storage area 406a, the RAM 406 also has an area (a second area) for decrypting an application program 421 read from the program storage area 406a or an application program 423 read from the mass storage nonvolatile memory 205. A decrypted application program 422 is held in the second area of the RAM 406. The program storage area 406a and the second area are not fixed areas.

The public key storage unit 407 holds a public key used for decrypting the encrypted application program.

The decryption unit 408 decrypts the encrypted application program using the public key held by the public key storage unit 407.

The execution unit 409 executes the application program 422 on which the decryption processing has been performed.

Figure 5:
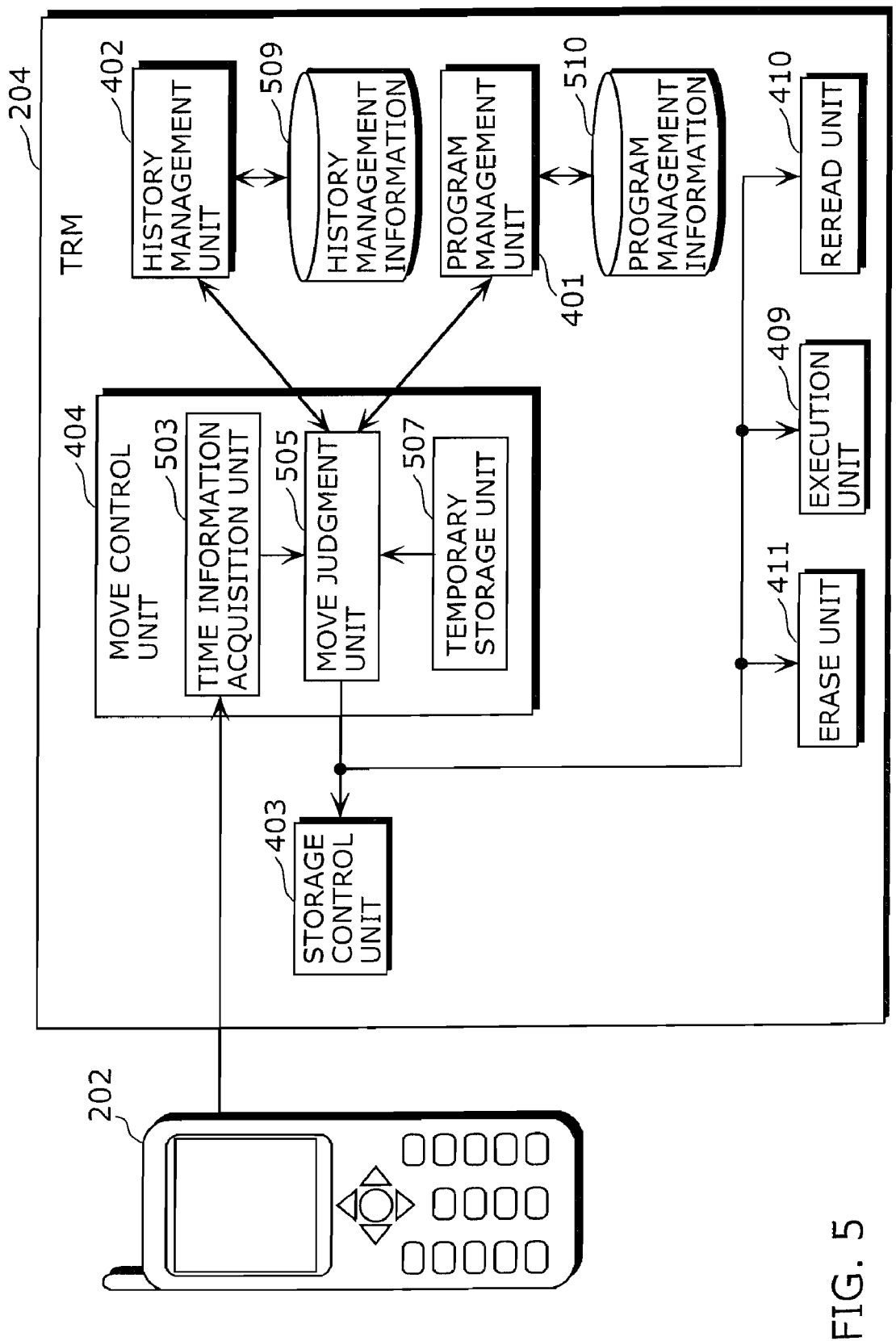
FIG. 5 is a block diagram of a TRM 204 of the SD card according to the first embodiment.

FIG. 5 is a block diagram of components included in the TRM 204 that execute a move of an application program. As shown in FIG. 5, the TRM 204 includes the program management unit 401, the history management unit 402, the storage control unit 403, the move control unit 404, the execution unit 409, the reread unit 410, and the erase unit 411. The move control unit 404 has a time information acquisition unit 503, a move judgment unit 505, and a temporary storage unit 507.

The time information acquisition unit 503 acquires time information from the host apparatus 202 via the SD I/F 207. The time information acquisition unit 503 may acquire a current time of day whenever accessing the application program. The time information acquisition unit 503 may first acquire a current time of day at the point when the application program is downloaded, so as to acquire a time of day at which to access the application program by calculating a time elapsed since the download from a clock of the CPU included in the SD card 203 and then adding the elapsed time to the time of day acquired when the application program was downloaded. It does not matter how the time information acquisition unit 503 acquires the current time of day.

The temporary storage unit 507 temporarily stores information including respective data sizes of the to-be-downloaded application program in the encrypted and decrypted forms, the information being notified when the download is started.

FIG. 6 is a diagram showing an example of history management information 509 managed by the history management unit 402. As shown in FIG. 6, the history management information 509 is made up of four items which are: a program ID for uniquely identifying an application program; a last access date showing a date when the application program was accessed last time; a second-last access date showing a date when the application program was accessed immediately prior to the last access date; and an access interval showing the number of days elapsed from the second-last access date to the last access date.

FIG. 7 is a diagram showing an example of program management information 510 managed by the program management unit 401. As shown in FIG. 7, the program management information 510 is made up of: a program ID uniquely identifying an application program; a storage location of the application program; a size of the application program in the encrypted form; a size of the application program in the decrypted form; a move flag showing that the present application program is determined to be moved from the program storage area 406a to the mass storage nonvolatile memory 205; and a decryption flag showing, in the case of the execution of the application program, that the decryption of the to-be-executed application has been completed. The storage location of the application program is the TRM 204 (the RAM 406) or the mass storage nonvolatile memory 205. As the move flag of the application program which is determined to be moved from the program storage area 406a to the mass storage nonvolatile memory 205, "1" (ON) is described. As the decryption flag of the application program which has been fully decrypted, "1" is described.

The move judgment unit 505 determines which application program is to be moved from the TRM 204 to the mass storage nonvolatile memory 205, using: the current time of day acquired from the time information acquisition unit 503; the information held in the temporary storage unit 507, that includes the respective data sizes of the application program in the encrypted and decrypted forms; the history management information 509 acquired from the history management unit 402; and the program management information acquired from the program management unit 401.

The following is a procedure for determining which application program is to be moved from the TRM 204 to the mass storage nonvolatile memory 205.

First, the move judgment unit 505 acquires the program management information 510 from the program management unit 401, and then acquires a current size of free space of the RAM 406 based on a full capacity of the RAM 406 and on the respective data sizes of each application program existing in the RAM 406 in the encrypted and decrypted forms.

When the application program is to be downloaded, the move judgment unit 505 compares the data size of the to-be-downloaded application program 420 in the encrypted form that is stored in the temporary storage unit 507 with the size of the free space of the RAM 406 that was previously acquired. When the data size of the to-be-downloaded application program 420 in the encrypted form exceeds the size of the free space of the RAM 406, the operation shifts to the processing whereby one of the application programs 421 stored in the program storage area 406a is moved to the mass storage nonvolatile memory 205.

When the application program is to be executed, the move judgment unit 505 compares the data size of the to-be-executed application program in the decrypted form with the size of the free space of the RAM 406. When the data size of the application program 422 in the decrypted form exceeds the size of the free space of the RAM 406, the operation shifts to the processing whereby one of the application programs 421 stored in the program storage area 406a is moved to the mass storage nonvolatile memory 205.

The move judgment unit 505 acquires the current time of day from the time information acquisition unit 503.

The move judgment unit 505 makes an inquiry to the program management unit 401 so as to acquire the IDs of the application programs each of whose storage locations is the TRM 204 in the program management information 510.

Next, the move judgment unit 505 makes an inquiry to the history management unit 402 so as to acquire the history management information 509. The move judgment unit 505 determines that the application program whose last access date is the earliest is the to-be-moved application program, and acquires the ID of the application program determined to be moved from among the program IDs extracted as a result of the previous inquiry made to the program management unit 401 as well as acquiring the data size of this application program in the encrypted form. Then, as to the application program determined to be moved, the move judgment unit 505 instructs the program management unit 401 to set the move flag in the program management information 510 to ON (1) and to update the storage location to the mass storage nonvolatile memory 205.

Next, the move judgment unit 505 adds the data size of the to-be-moved application program in the encrypted form to the free space of the RAM 406, and checks whether or not the size of the free space of the RAM 406 sufficient for downloading the application program or for decrypting the application program can be secured. When the free space of the RAM 406 cannot be sufficiently secured even after one application program is moved to the mass storage nonvolatile memory 205, the move judgment unit 505 makes the inquiries to the program management unit 401 and the history management unit 402 again, and then extracts the ID of the application program to be moved to the mass storage nonvolatile memory 205. The move judgment unit 505 will repeat the extraction of the ID of the application program to be moved to the mass storage nonvolatile memory 205 until an area of the RAM 406 that is needed for downloading the application program or for decrypting the to-be-executed application program can be secured.

Moreover, when the application program 423 having moved to the mass storage nonvolatile memory 205 is to be executed and an area needed for decrypting the application program 423 cannot be secured in the RAM 406, the move judgment unit 505 performs the same processing as described above. In this way, the area needed for decrypting the application program 423 is secured in the RAM 406.

In the end, the move judgment unit 505 notifies the move control unit 404 of the ID of each application program whose move flag is set to ON (1) in the program management information 510.

The move control unit 404 copies the application program that has the program ID notified by the move judgment unit 505, to the mass storage nonvolatile memory 205. After the completion of the copy of the application program to the mass storage nonvolatile memory 205, the move control unit 404 instructs the program management unit 401, via the move judgment unit 505, to set all of the move flags in the program management information 510 to OFF (0). The move control unit 404 erases the application program 421 which has been copied to the mass storage nonvolatile memory 205.

The erase unit 411 erases the application program 422 which has been decrypted and is no longer an execution object.

The execution unit 409 executes the application program 422 on which the decryption processing has been performed.

When the application program 423 having moved to the mass storage nonvolatile memory 205 is to be executed, the reread unit 410 reads the application program 423 from the mass storage nonvolatile memory 205.

Figure 8:
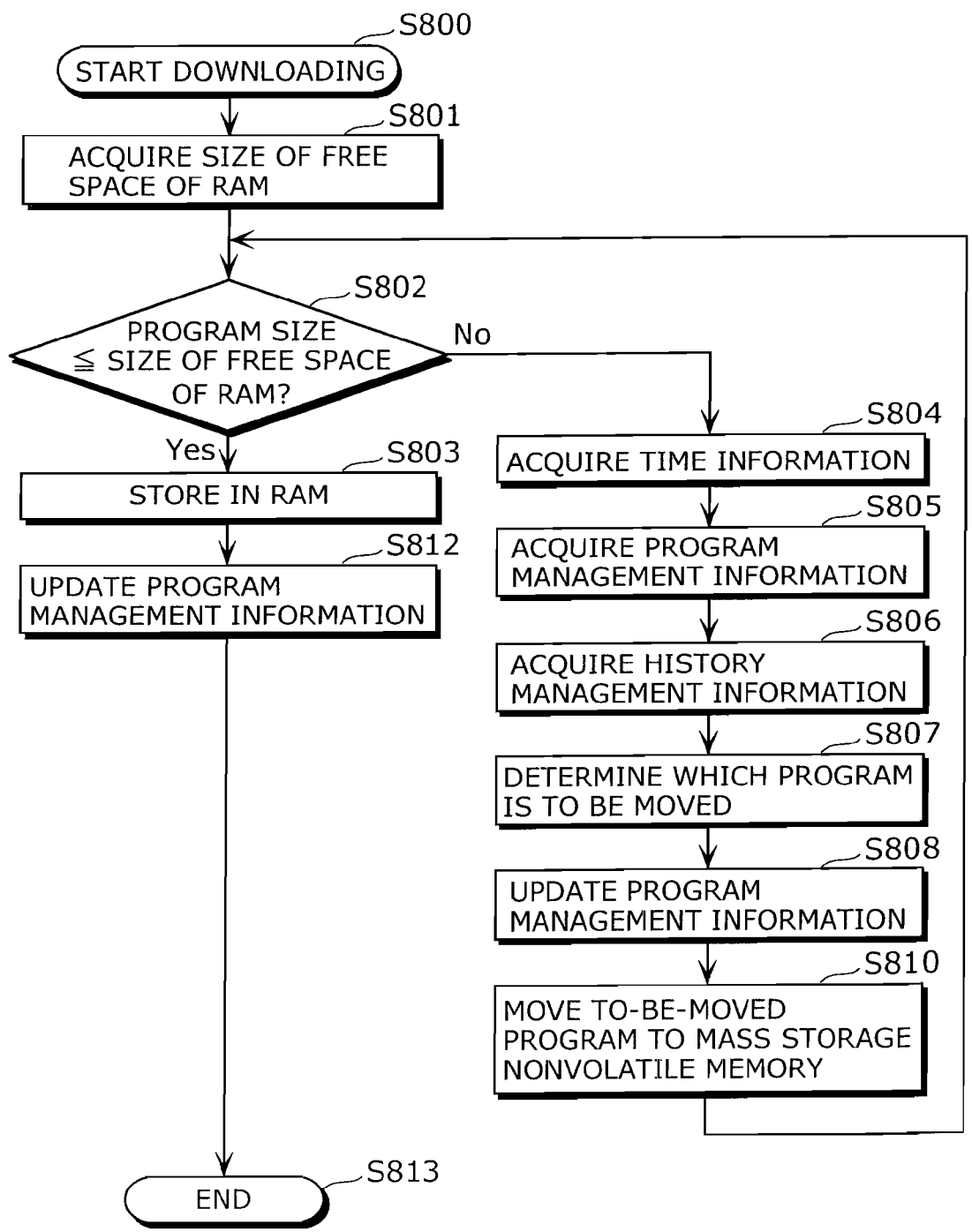
FIG. 8 is a diagram showing a flow of move processing of an application program that is performed when an application program is downloaded, according to the first embodiment.

FIG. 8 is a diagram showing a flow of move processing of an application program that is performed when an application program is downloaded. When the download of the application program is started (S800), the components of the TRM 204 operate as follows.

First, the temporary storage unit 507 holds the respective data sizes of the to-be-downloaded application program in the encrypted and decrypted forms, the data sizes having been notified prior to the download.

Next, the move judgment unit 505 acquires the program management information 510 from the program management unit 401, and then acquires a current size of free space of the RAM 406 based on a full capacity of the RAM 406 and on the respective data sizes of each application program existing in the RAM 406 in the encrypted and decrypted forms.

Next, the move judgment unit 505 compares the acquired size of the free space of the RAM 406 with the data size of the to-be-downloaded application program in the encrypted form that is stored in the temporary storage unit 507. It should be noted here that the free space of the RAM 406 and the program storage area 406 are equal in size.

When the size of the to-be-downloaded application program is equal to or smaller than the size of the free space of the RAM 406 (Yes in S802), the program acquisition unit 400 acquires the application program to be downloaded and the storage control unit 403 stores the acquired application program in the program storage area 406a of the RAM 406 (S803). Then, the move judgment unit 505 instructs the program management unit 401 to update the program management information 510, so that the program management unit 401 updates the program management information 510 (S812). Accordingly, the download processing is terminated (S813).

On the other hand, when the size of the to-be-downloaded application program exceeds the size of the free space of the RAM 406 (No in S802), the move judgment unit 505 starts the processing to secure free space in the RAM 406.

First, the move judgment unit 505 acquires the time information from the time information acquisition unit 503 (S804).

Then, the move judgment unit 505 makes an inquiry to the program management unit 401 so as to acquire the program management information 510 and to acquire the IDs of the application programs each of whose storage locations is TRM 204 (S805).

Next, the move judgment unit 505 makes an inquiry to the history management unit 402 so as to acquire the history management information 509 (S806).

From the history management information 509 acquired in S806, the move judgment unit 505 determines that, among the program IDs acquired in S805, the application program whose last access date is the earliest is the application program to be moved to the mass storage nonvolatile memory 205, and acquires the data size of the to-be-moved application program in the encrypted form from the program management information 510 (S807).

Next, as to the application program determined to be moved, the move judgment unit 505 instructs the program management unit 401 to set the move flag to ON (1) in the program management information 510 and to update the storage location to the mass storage nonvolatile memory 205. Following this instruction, the program management unit 401 updates the program management information 510 (S808).

The storage control unit 403 moves the application program, which is determined in S807 to be moved, to the mass storage nonvolatile memory 205 (810). Next, the size of free space of the RAM after the move processing is acquired, and then the processing transits to S802. The processing from S802 to S810 is repeated until the program storage area 406a becomes available to store the application program to be downloaded.

Finally, the program management unit 401 sets all the move flags in the program management information 510 to OFF (0), and the processing for downloading the application program is terminated (S813).

It should be noted here that the move judgment unit 505 determines in S807 that the application program whose last access date is the earliest is the application program to be moved, in the above description. However, the move judgment unit 505 may determine the application program whose access interval is the longest to be moved, or may determine the application program which is accessed only on a specific day of the week to be moved. More specifically, the move judgment unit 505 may determine which application program is to be moved to the mass storage nonvolatile memory 205, on the basis of the execution history of the application program. Nevertheless, it does not matter how the application program to be moved is determined as long as the method causes free space in the RAM 406 to become larger than the size of the application program which is to be, for example, downloaded and stored in the RAM 406.

Figure 9:
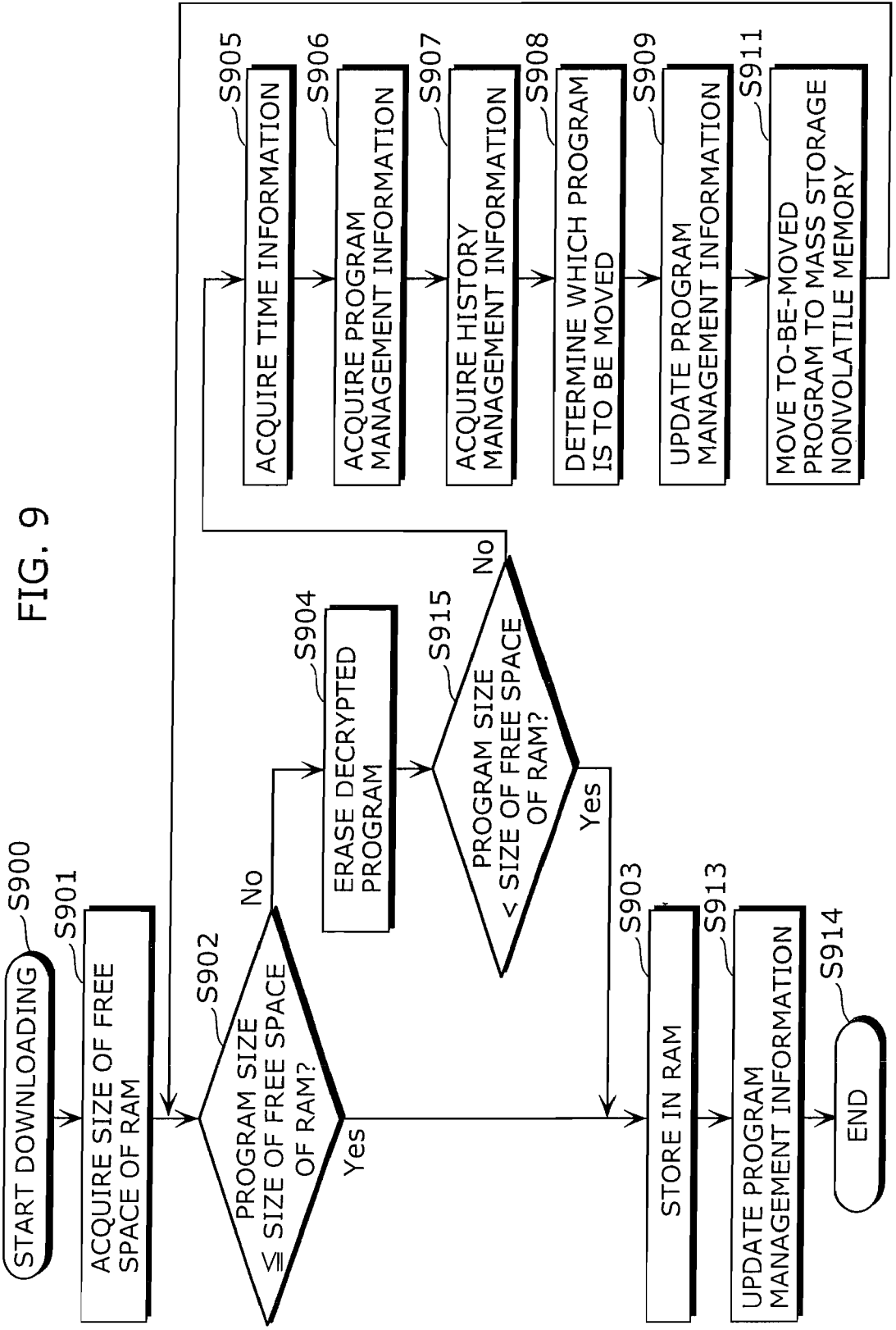
FIG. 9 is a diagram showing a flow of move processing of an application program that is performed when an application program is downloaded, in the case where a decrypted application program exists in a RAM.

FIG. 9 is a diagram showing a flow of move processing of an application program that is performed when an application program is downloaded, in the case where the decrypted application program 422 exists in the RAM 406. The flow is almost the same as the processing flow shown in FIG. 8, and a difference lies in S904. In the processing flow of FIG. 8, the application program to be moved to the mass storage nonvolatile memory 205 in order to secure free space in the RAM 406 is determined from among the application programs 421 stored in the program storage area 406a. In S904, on the other hand, the erase unit 411 places a higher priority on erasing the decrypted application program 422 existing in the RAM 406 than on determining which application program is to be moved to the mass storage nonvolatile memory 205. In this regard, FIG. 9 and FIG. 8 are different.

Figure 10:
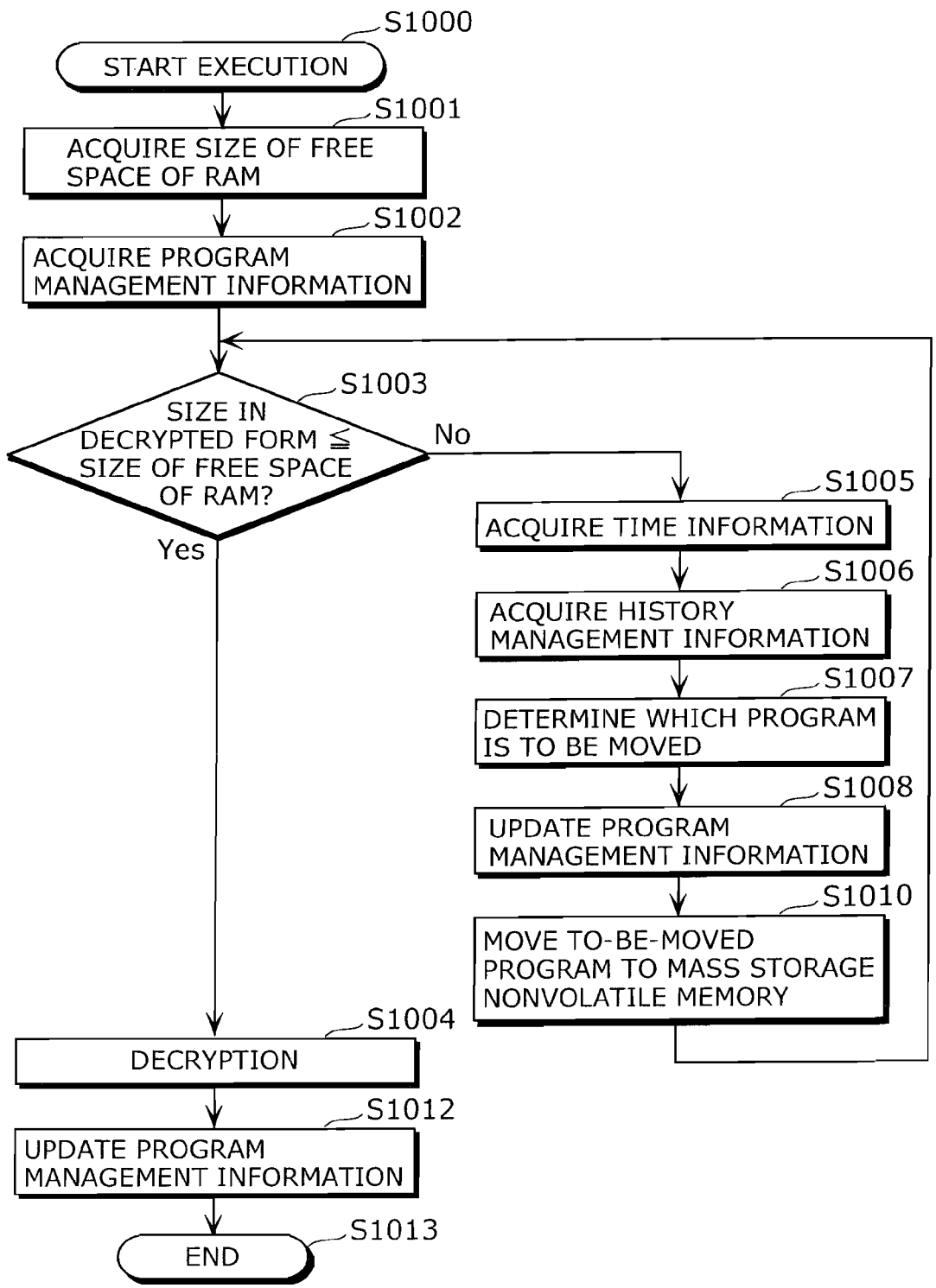
FIG. 10 is a diagram showing a flow of processing that is performed when the application program stored in the RAM is executed, according to the first embodiment.

FIG. 10 is a diagram showing a flow of processing that is performed when the application program stored in the program storage area 406a is executed.

When the execution of the application program is started (S1000), the move judgment unit 505 acquires the program management information 510 from the program management unit 401 and so acquires the size of the free space of the RAM 406 by the same procedure as in S801 (S1001).

Moreover, the move judgment unit 505 acquires the size of the to-be-executed program in the decrypted form from the program management information 510 acquired in S1001 (S1002).

Next, the move judgment unit 505 compares the acquired size of the free space of the RAM 406 with the data size in the decrypted form acquired in S1002 (S1003). It should be noted here that the free space of the RAM 406 and the program storage area 406a are equal in size. When the data size in the decrypted form is equal to or smaller than the size of the free space of the RAM 406 (Yes in S1003): the decryption unit 408 decrypts the encrypted application program which is to be executed (S1004); the program management unit 401 updates the program management information 510 (S1012); and the execution unit 409 executes the application program (S1013). On the other hand, when the data size in the decrypted form exceeds the size of the free space of the RAM 406 (No in S1003), the move judgment unit 505 starts the processing in order to secure free space in the RAM 406.

First, the move judgment unit 505 acquires the current time of day from the time information acquisition unit 503 (S1005).

Next, the move judgment unit 505 makes an inquiry to the history management unit 402 so as to acquire the history management information 509 (S1006). From the history management information 509 acquired in S1006 and the program management information 510 acquired in S1002, the move judgment unit 505 determines that the application program whose storage location is the TRM 204 and whose last access date is the earliest is the application program to be moved to the mass storage nonvolatile memory 205, and acquires its data size in the encrypted form (S1007). It should be noted here that, as in the case of FIG. 8, the algorithm for determining the to-be-moved application program from the history management information 509 may be a determination method with consideration given to a use frequency or the like, and that the method does not matter.

Then, as to the application program determined to be moved, the move judgment unit 505 instructs the program management unit 401 to set the move flag to ON (1) and to update the storage location to the mass storage nonvolatile memory 205 in the program management information 510, so that the program management unit 401 updates the program management information 510 (S1008).

The move control unit 404 moves the application program, which is determined in S1007 to be moved, to the mass storage nonvolatile memory 205 (S1010). Next, the size of the free space of the RAM after the move processing is acquired, and then the processing transits to S1003. The processing from S1003 to S1010 is repeated until the free space of the RAM 406 becomes available to execute the decryption processing on the to-be-executed application program.

Next, the decryption unit 408 performs the decryption processing on the to-be-executed application program (S1004).

The program management unit 401 sets all the move flags in the program management information 510 to OFF (0), and updates the program management information 510 (S1012).

Then, the execution unit 409 executes the application program (S1013).

Figure 11:
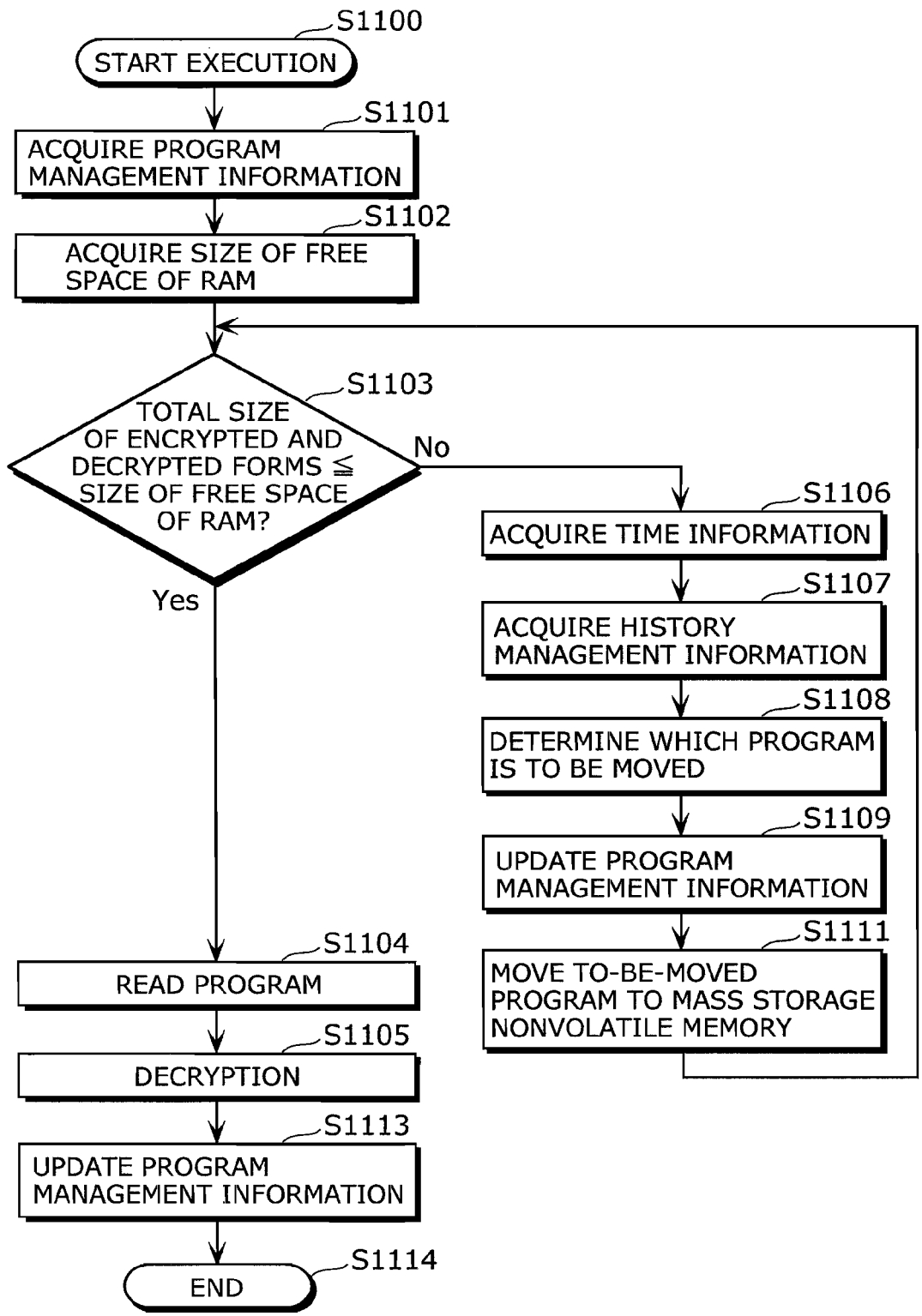
FIG. 11 is a diagram showing a flow of processing that is performed when the application program having been moved to a mass storage nonvolatile memory is executed, according to the first embodiment.

FIG. 11 is a diagram showing a flow of processing that is performed when the application program 423 having been moved to the mass storage nonvolatile memory 205 is executed. When the execution of the application program is started (S1100), the components of the TRM 204 operate as follows.

First, the move judgment unit 505 acquires the program management information 510 from the program management unit 401 in order to confirm that the storage location of the application program which is to be executed is the mass storage nonvolatile memory 205 and also to acquire the respective data sizes of the to-be-executed application program in the encrypted and decrypted forms (S1101).

Then, the move judgment unit 505 acquires the size of the free space of the RAM 406 from the storage location information, the data size in the encrypted form, and the data size in the decrypted form included in the program management information 510 acquired in S1101 (S1102).

Next, the move judgment unit 505 compares a total of the data sizes of the to-be-executed application program in the encrypted and decrypted forms acquired in S1101 with the size of the free space of the RAM 406 acquired in S1102 (S1103). It should be noted here that the free space of the RAM 406 and the program storage area 406 are equal in size.

When the above-mentioned total is equal to or smaller than the size of the free space of the RAM 406 (Yes in S1103), the reread unit 410 reads the to-be-executed application program 423 from the mass storage nonvolatile memory 205, and the storage control unit 403 stores the read to-be-executed application program 423 in the RAM 406 (S1104). The decryption unit 408 performs the decryption processing (S1105). The program management unit 401 updates the program management information (S1113). The execution unit 409 executes the to-be-executed application program (S1114).

On the other hand, when the above-mentioned total exceeds the size of the free space of the RAM 406 (No in S1103), the move judgment unit 505 starts the processing to secure free space in the RAM 406.

First, the move judgment unit 505 acquires the current time of day from the time information acquisition unit 503 (S1106).

Next, the move judgment unit 505 makes an inquiry to the history management unit 402 so as to acquire the history management information 509 (S1107).

Then, the move judgment unit 505 extracts a program ID of the application program whose storage location is the TRM 204 in the program management information 510 acquired in S1101 and whose last access date is the earliest in the history management information 509 acquired in S1107. The move judgment unit 505 determines that the application program corresponding to the extracted program ID is to be moved to the mass storage nonvolatile memory 205 (S1108), and acquires the data size of the to-be-moved application program in the encrypted form from the program management information 510.

Next, as to the application program determined to be moved, the program management unit 401 sets the move flag to ON (1) and updates the storage location to the mass storage nonvolatile memory 205 in the program management information 510 (S1109).

The move control unit 404 moves the application program, which is determined in S1108 to be moved, from the program storage area 406a to the mass storage nonvolatile memory 205 (S1111). Next, the size of the free space of the RAM after the move processing is acquired, and then the processing transits to S1103. The processing from S1103 to S1111 is repeated until the decryption processing is allowed to be performed on the to-be-executed application program.

Finally, the program management unit 401 sets all the move flags in the program management information 510 to OFF (0), and the move processing for the application program is terminated.

After the completion of the move processing for the application program, the move control unit 404 reads the to-be-executed application program 423 from the mass storage nonvolatile memory 205 and copies the read to-be-executed application program 423 to the RAM 406 (S1104).

Finally, the move control unit 404 performs the decryption processing (S1105), and the program management unit 401 updates the program management information 510 (S1113). After this, the execution unit 409 executes the application program 422 which has been decrypted in S1105 (S1114).

It should be noted here that the move judgment unit 505 determines in S1108 that the application program whose last access date is the earliest is the application program to be moved. However, the move judgment unit 505 may determine the application program whose access interval is the longest to be moved, or may determine the application program which is accessed only on a specific day of the week to be moved. More specifically, the move judgment unit 505 may determine which application program is to be moved to the mass storage nonvolatile memory 205, on the basis of the execution history of the application program. It does not matter how the application program to be moved is determined as long as the method causes free space in the RAM 406 to become larger than the size of the application program which is to be, for example, downloaded and stored in the RAM 406.

In the processing to secure free space in the RAM 406 that is shown in the processing flow of in FIG. 11, the move processing is performed on the application program 421 stored in the program storage area 406a as described in S1106 to S1110. However, when the decrypted application program exists in the RAM 406, a higher priority may be given to the processing performed by the erase unit 411 to erase the decrypted application program 422 existing in the RAM 406.

In S1103 of the processing flow shown in FIG. 11, the move judgment unit 505 compares the total of the data sizes of the to-be-executed application program in the encrypted and decrypted forms with the size of the free space of the RAM 406. However, the move judgment unit 505 may compare the data size of the to-be-executed application program in the decrypted form with the size of the free space of the RAM 406 in S1103.

In this case, when the data size of the to-be-executed application program in the decrypted form is equal to or smaller than the size of the free space of the RAM 406 (Yes in S1103), the decryption unit 408 may read the to-be-executed application program to perform the decryption processing and then store the program in the RAM 406. On the other hand, when the data size of the to-be-executed application program in the decrypted form exceeds the size of the free space of the RAM 406 (No in S1103), the move judgment unit 505 starts the processing to secure free space in the RAM 406 so that the data size of the to-be-executed application program in the decrypted form becomes equal to or smaller than the size of the free space of the RAM 406.

According to the construction and the operations described above, the application program downloaded from the service provider can be easily moved to the mass storage nonvolatile memory 205 in its encrypted form as downloaded. This allows more application programs to be stored in the secure memory card, including the SD card 203, which is equipped with the IC card function, while maintaining the security level required by the service provider.

FIG. 12 is a diagram showing an example of information about application programs provided by the service provider.

The following is a specific explanation about processing for downloading and executing the application programs shown in FIG. 12. Suppose that a full capacity of the RAM 406 is 120 KB in the following explanation.

As Step 1, a detailed explanation is given as to a flow of processing performed when the RAM 406 is unused and an application program A is downloaded to the SD card 203.

Following an instruction from the host apparatus 202 to download the application program A, the download processing of the application program A is started.

As soon as the download processing is started, information including the respective data sizes of the application program A in the encrypted and decrypted forms is sent from the service provider to the SD card 203. The sent information is stored in the temporary storage unit 507. In this case, the temporary storage unit 507 stores 10 KB as the data size of the application program A in the encrypted form and 30 KB as the data size of the application program A in the decrypted form.

Then, the move judgment unit 505 acquires the program management information 510 from the program management unit 401 so as to acquire the size of the free space of the RAM 406. In this case, since no application program has been downloaded, the size of a used area of the RAM 406 is 0 KB and the size of the free space of the RAM 406 is 120 KB.

Next, the move judgment unit 505 compares the data size of the application program A in the encrypted form that is stored in the temporary storage unit 507 with the size of the free space of the RAM 406. In this case, since the data size of the application program A in the encrypted form is 10 KB and the size of the free space of the RAM 406 is 120 KB, the move judgment unit 505 judges that the application program A can be stored in the program storage area 406*a*. Thus, the storage control unit 403 stores the application program A in the program storage area 406*a*.

Accordingly, the download processing of the application program A is completed.

Figure 13A:
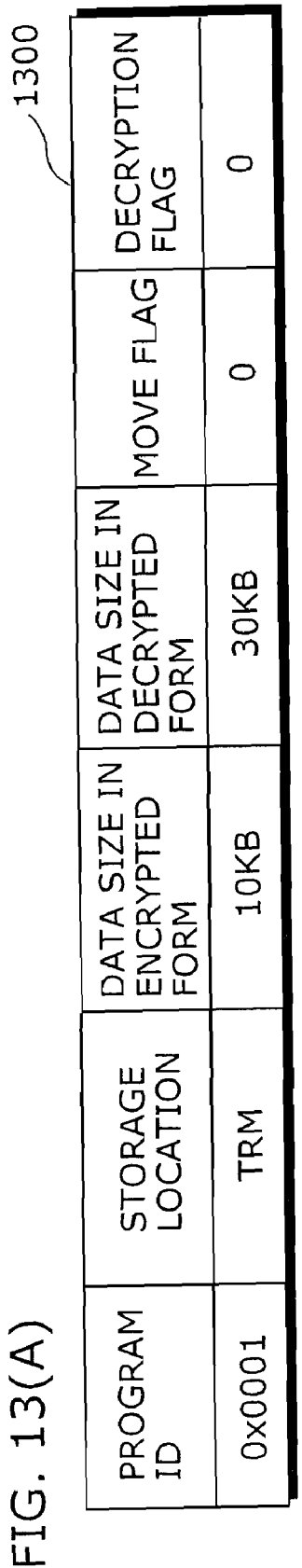
FIG. 13(A) is a diagram showing program management information obtained after the completion of the download processing of an application program A according to the first embodiment.
Figure 13B:
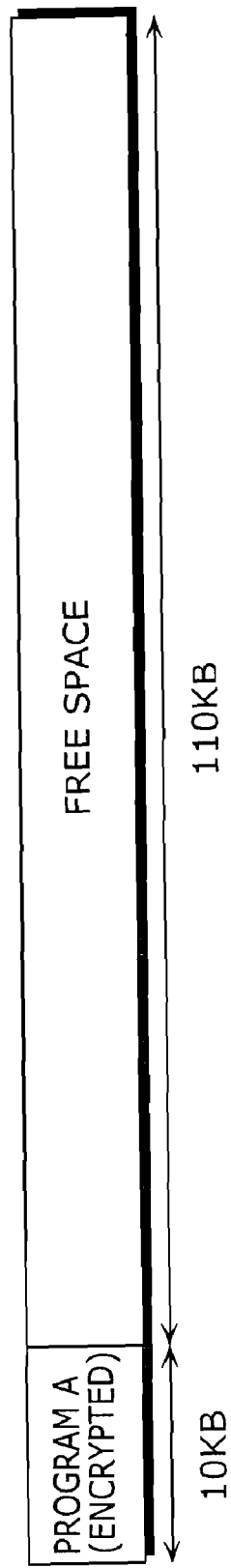
FIG. 13(B) is a diagram showing a state of the RAM after the completion of the download processing of the application program A according to the first embodiment.

After the completion of the download processing of the application program A, the program management information 510 is updated by the program management unit 401, as shown in FIG. 13(A). Additionally, the state of the RAM 406 is as shown in FIG. 13(B).

Next, as Step 2, a detailed explanation is given as to a flow of processing performed when an application program B is downloaded to the SD card 203.

Following an instruction from the host apparatus 202 to download the application program B, the download processing of the application program B is started.

As is the case with the downloading of the application program A described in Step 1, as soon as the download processing is started, information regarding the application program B (the respective data sizes in the encrypted and decrypted forms) is stored in the temporary storage unit 507. In this case, the temporary storage unit 507 stores 30 KB as the data size of the application program B in the encrypted form and 50 KB as the data size of the application program B in the decrypted form.

Then, the move judgment unit 505 acquires program management information 1300 which has been updated in Step 1 from the program management unit 401 so as to acquire the size of the free space of the RAM 406. In this case, since the RAM 406 stores only the application program A, the size of the used area of the RAM 406 is 10 KB and the size of the free space of the RAM 406 is 110 KB.

Next, the move judgment unit 505 compares the data size of the application program B in the encrypted form that is stored in the temporary storage unit 507 with the size of the free space of the RAM 406. In this case, since the data size of the application program B in the encrypted form is 30 KB and the size of the free space of the RAM 406 is 110 KB, the move judgment unit 505 judges that the application program B can be stored in the program storage area 406*a*. Thus, the storage control unit 403 stores the application program B in the program storage area 406*a*.

Accordingly, the download processing of the application program B is completed.

Figure 14A:
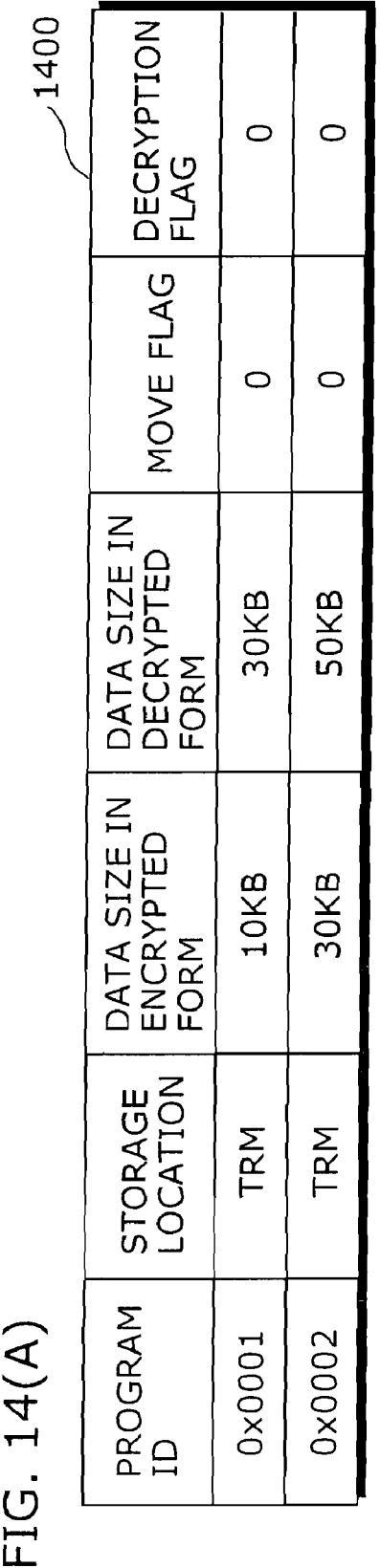
FIG. 14(A) is a diagram showing the program management information obtained after the completion of the download processing of an application program B according to the first embodiment.
Figure 14B:
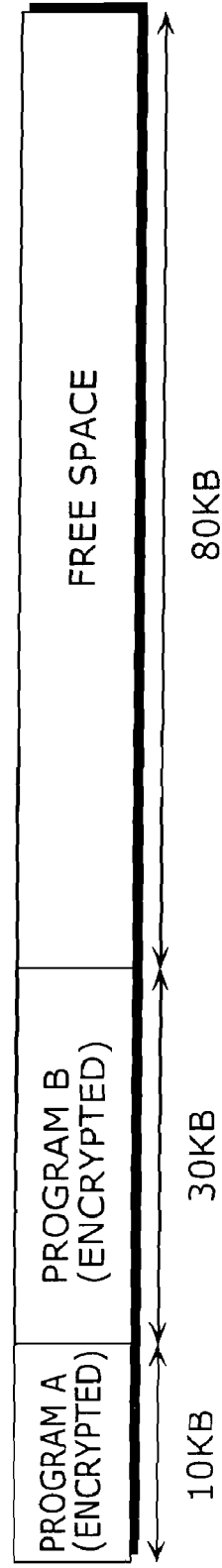
FIG. 14(B) is a diagram showing a state of the RAM after the completion of the download processing of the application program B according to the first embodiment.

After the completion of the download processing of the application program B, the program management information 1300 is updated by the program management unit 401, as shown in FIG. 14(A). Additionally, the state of the RAM 406 is as shown in FIG. 14(B).

Next, as Step 3, a detailed explanation is given as to a flow of processing performed when the application program B is executed.

Following an instruction from the host apparatus 202 to execute the application program B, the execution processing of the application program B is started.

First, the move judgment unit 505 acquires program management information 1400 which has been updated in Step 2 from the program management unit 401 so as to acquire the data size of the to-be-executed application program B in the decrypted form, and then stores the acquired data size in the temporary storage unit 507. In this case, a value stored in the temporary storage unit 507 is 50 KB.

Then, the move judgment unit 505 acquires the size of the free space of the RAM 406 from the program management information 1400. In this case, since the RAM 406 stores the encrypted application program A (10 KB) and the encrypted application program B (30 KB), the size of the free space of the RAM 406 is 80 KB.

Next, the move judgment unit 505 compares 50 KB which is the data size of the decrypted application program B and is stored in the temporary memory 507 with 80 KB which is the size of the free space of the RAM 406. The move judgment unit 505 then judges that the application program B can be decrypted in the RAM 406.

Figures 15A, 15B:
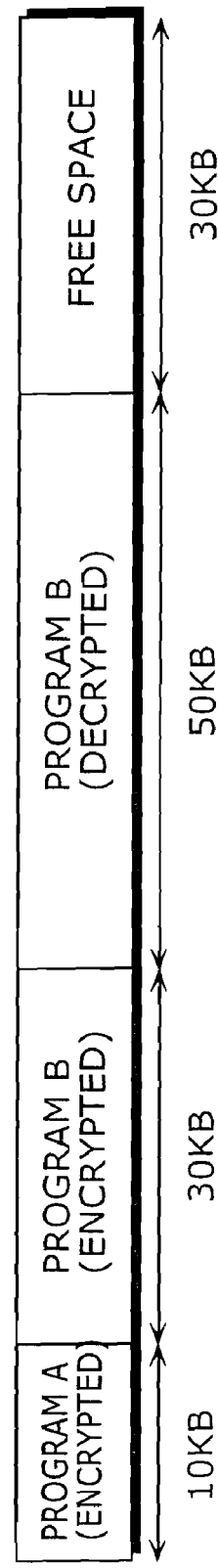
FIG. 15(A) is a diagram showing the program management information obtained after the execution of the download processing of the application program B according to the first embodiment.
FIG. 15(B) is a diagram showing a state of the RAM after the execution of the application program B according to the first embodiment.

After this, the decryption unit 408 decrypts the application program B as described in S1004, and the program management unit 401 updates the program management information 1400 as shown in FIG. 15(A). The state of the RAM 406 is as shown in FIG. 15(B).

Accordingly, the application program B becomes executable, so that the execution unit 409 executes the application program B.

Next, as Step 4, a detailed explanation is given as to a flow of processing performed when an application program C is downloaded to the SD card 203.

Following an instruction from the host apparatus 202 to download the application program C, the download processing of the application program C is started.

As is the case with the downloading of the application program A described in Step 1, as soon as the download processing is started, information regarding the application program C (the respective data sizes in the encrypted and decrypted forms) is stored in the temporary storage unit 507. In this case, the temporary storage unit 507 stores 40 KB as the data size of the application program C in the encrypted form and 70 KB as the data size of the application program C in the decrypted form.

Then, the move judgment unit 505 acquires program management information 1500 which has been updated in Step 3 from the program management unit 401 so as to acquire the size of the free space of the RAM 406. In this case, since the encrypted application program A (10 KB), the encrypted application program B (30 KB), and the decrypted application program B (50 KB) exist in the RAM 406, the size of the free space of the RAM 406 is 30 KB.

Next, the move judgment unit 505 compares the data size of the application program C in the encrypted form (40 KB) that is stored in the temporary storage unit 507 with the size of the free space of the RAM 406 (30 KB). In this case, since the free space of the RAM 406 is insufficient, the move judgment unit 505 performs the processing to secure free space in the RAM 406.

As the flow of the processing performed to secure free space in the RAM 406, S904 is adopted here.

To be more specific, in accordance with the processing flow of S904, the move judgment unit 505 selects the processing to erase the decrypted application program B, out of the three application programs existing in the RAM 406.

Then, the move judgment unit 505 acquires the size of the free space of the RAM 406 once again. After the decrypted application program B was erased, the size of the free space of the RAM 406 becomes 80 KB. The move judgment unit 505 compares the data size of the encrypted application program C (40 KB) that is stored in the temporary storage unit 507 with the size of the free space of the RAM 406 (80 KB), and judges that the application program C can be downloaded.

Next, the storage control unit 403 stores the downloaded application program C in the program storage area 406*a*.

Figures 16A, 16B:
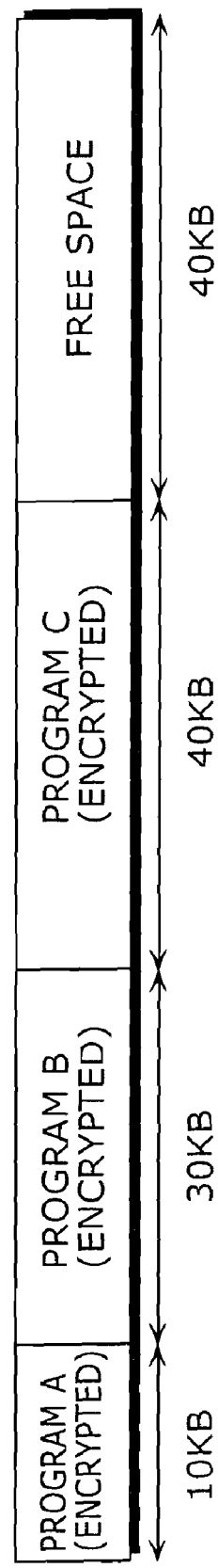
FIG. 16(A) is a diagram showing the program management information obtained after the completion of the download processing of an application program C according to the first embodiment.
FIG. 16(B) is a diagram showing a state of the RAM after the completion of the download processing of the application program C according to the first embodiment.

Then, the program management information 1500 is updated by the program management unit 401 as shown in FIG. 16(A). Additionally, the state of the RAM 406 is as shown in FIG. 16(B).

Accordingly, the download processing of the application program C is completed.

Next, as Step 5, a detailed explanation is given as to a flow of processing performed when the application program C is executed.

Following an instruction from the host apparatus 202 to execute the application program C, the execution processing of the application program C is started.

As described in Step 3, the move judgment unit 505 first acquires the data size of the application program C in the decrypted form (70 KB) from program management information 1600 which has been updated, and then stores the acquired data size in the temporary storage unit 507.

As described in Step 3, the move judgment unit 505 then acquires the size of the free space of the RAM 406 from the program management information 1600. In this case, the size of the free space of the RAM 406 is 40 KB.

Next, the move judgment unit 505 compares the data size of the decrypted application program C (70 KB) that is stored in the temporary memory 507 with the size of the free space of the RAM 406 (40 KB). Thus, the move judgment unit 505 judges that an area needed for executing the application program C cannot be secured in the RAM 406.

In accordance with the processing flow from S1005 to S1008, the move judgment unit 505 performs the processing to determine which application program is to be moved to the mass storage nonvolatile memory 205. In this case, suppose that the application programs are moved to the mass storage nonvolatile memory 205 in the order in which the application programs were downloaded, starting from the application program which was firstly downloaded. The move judgment unit 505 determines the application program A, which was downloaded in Step 1, to be the application program to be moved to the mass storage nonvolatile memory 205.

Figures 17A, 17B:
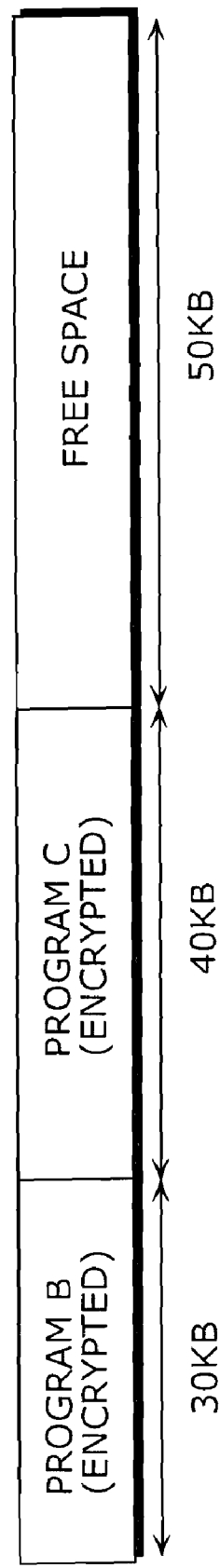
FIG. 17(A) is a diagram showing the program management information obtained after the application program A is determined to be moved in order for the application program C to be executed according to the first embodiment.
FIG. 17(B) is a diagram showing a state of the RAM after the application program A is determined to be moved in order for the application program C to be executed according to the first embodiment.

Next, the program management unit 401 updates the program management information 1600 as shown in FIG. 17(A), and the state of the RAM 406 is as shown in FIG. 17(B).

Once again, the move judgment unit 505 compares the data size of the decrypted application program C (70 KB) that is stored in the temporary memory 507 with the size of the free space of the RAM 406 (50 KB). Thus, the move judgment unit 505 judges that the area needed for executing the application program C still cannot be secured in the RAM 406.

The move judgment unit 505 selects the application program B downloaded in Step 2 as the application program to be moved.

Figures 18A, 18B:
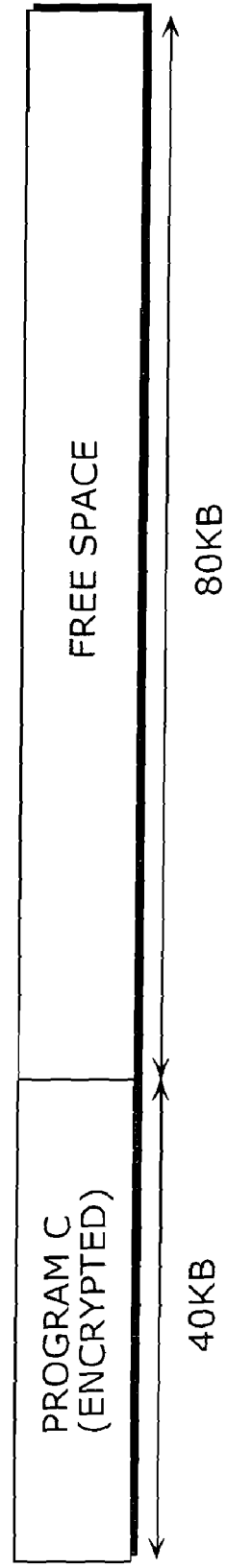
FIG. 18(A) is a diagram showing the program management information obtained after the application program B is also determined to be moved in order for the application program C to be executed according to the first embodiment, and FIG.

Then, the program management unit 401 updates program management information 1700 as shown in FIG. 18(A), and the state of the RAM 406 is as shown in FIG. 18(B).

Once again, the move judgment unit 505 compares the data size of the decrypted application program C (70 KB) that is stored in the temporary memory 507 with the size of the free space of the RAM 406 (80 KB). Thus, the move judgment unit 505 judges that the area needed for executing the application program C can be secured in the RAM 406.

The move control unit 404 copies the application program A (ID: 0x0001) and the application program B (ID: 0x0002) whose move flags are set to ON (1) in program management information 1800, from the RAM 406 to the mass storage nonvolatile memory 205.

Then, the move control unit 404 erases the application program A and the application program B, which has been fully copied, from the program storage area 406*a*.

Finally, the program management information 1800 is updated by the program management unit 401 as shown in FIG. 19(A), and the state of the RAM 406 is as shown in FIG. 19(B).

Accordingly, the application program C becomes executable, so that the execution unit 409 executes the application program C.

Next, as Step 6, a detailed explanation is given as to a flow of processing performed when the application program B having been moved to the mass storage nonvolatile memory 205 is executed.

Following an instruction from the host apparatus 202 to execute the application program B, the execution processing of the application program B is started.

As described in Step 3, the move judgment unit 505 first acquires the data size of the application program B in the decrypted form (50 KB) from program management information 1900 which has been updated, and then stores the acquired data size in the temporary storage unit 507.

As described in Step 3, the move judgment unit 505 then acquires the size of the free space of the RAM 406 from the program management information 1900. In this case, the size of the free space of the RAM 406 is 10 KB.

Next, the move judgment unit 505 compares the data size of the application program B in the decrypted form (50 KB) that is stored in the temporary memory 507 with the size of the free space of the RAM 406 (10 KB). Thus, the move judgment unit 505 judges that an area needed for executing the application program B cannot be secured in the RAM 406.

Then, the move judgment unit 505 first adopts the processing flow whereby the decrypted application program in the RAM 406 is erased on a priority basis, and so determines the decrypted application program C to be erased with reference to the program management information 1900.

Thus, the erase unit 411 erases the decrypted application program C (70 KB) in the RAM 406.

After the application program C is erased, the program management unit 401 updates the program management information 1900 as shown in FIG. 20(A). Additionally, the state of the RAM 406 is as shown in FIG. 20(B).

Once again, the move judgment unit 505 compares the data size of the application program B in the decrypted form (50 KB) that is stored in the temporary memory 507 with the size of the free space of the RAM 406 (80 KB). Thus, the move judgment unit 505 judges that the area needed for decrypting the application program B can be secured in the RAM 406.

The move control unit 404 reads the application program B from the mass storage nonvolatile memory 205 and copies it to the RAM 406 where the decryption processing is performed on the application program B.

Then, the program management unit 401 updates program management information 2000 as shown in FIG. 21(A). Here, the state of the RAM 406 is as shown in FIG. 21(B).

Finally, the execution unit 409 executes the application program B on which the decryption processing has been performed.

Accordingly, the application program B having been moved to the mass storage nonvolatile memory 205 is executed.

It should be noted here that in the first embodiment, the TRM 204 is an example of the IC card unit of the memory card according to the present invention; the mass storage nonvolatile memory 205 is an example of the flash memory unit of the memory card according to the present invention; and the RAM 406 is an example of the tamper resistant storage unit of the memory card according to the present invention.

The data size of the application program in the decrypted form is downloaded. For this reason, when executing the application program, the execution unit 409 may acquire the data size of the application program in the decrypted form by executing the application program and judge whether or not the acquired size agrees with the downloaded size. When the two disagree with each other, the application program to be executed is an unauthorized program. Thus, the execution unit 409 stops the execution of the application program. This accordingly can achieve an effect where only an authorized program continues to be executed.

Moreover, the storage control unit 404 may store the application program 420 downloaded from the service provider in the program storage area 406a as well as in the mass storage nonvolatile memory 205. In this case, when the data size of the application program to be downloaded or executed exceeds the size of the free space of the RAM 406, the storage control unit 403 simply erases one or more of the encrypted application programs existing in the RAM 406. As a result, the size of the free space in the RAM 406 becomes larger than the data size of the application program to be downloaded or executed, so that the application program can be placed in the RAM 406.

Furthermore, when the data size of the to-be-downloaded application program in the encrypted form exceeds the size of the free space of the RAM 406, the storage control unit 403 may store the to-be-downloaded application program acquired by the program acquisition unit 400 in the mass storage nonvolatile memory 205.

Also, after the execution of the application program, the execution unit 409 may move the to-be-executed encrypted application program to the mass storage nonvolatile memory 205.

Second Embodiment

FIG. 22 is a block diagram of an SD card 2200 according to the second embodiment. In addition to the components included in the SD card 203 of the first embodiment, the SD card 2200 is composed of a key generation unit 2217, an additional encryption unit 2218, and an additional decryption unit 2219. For the sake of simplifying the explanation, FIG. 22 does not show the program management unit 401, the history management unit 402, the storage control unit 403, the public key storage unit 407, the decryption unit 408, and the execution unit 409 which are shown in FIG. 4.

From the host apparatus 202, the program acquisition unit 400 acquires information, such as a Subscriber Identity Module Identifier (SIM ID) and a terminal ID, which is unique to the host apparatus. The key generation unit 2217 generates an encryption key using the information which is unique to the host apparatus. The additional encryption unit 2218 encrypts the application program which is to be moved from the TRM 204 to the mass storage nonvolatile memory 205, using the encryption key generated by the key generation unit 2217. The move control unit 404 copies the application program encrypted by the additional encryption unit 2218 from the RAM 406 to the mass storage nonvolatile memory 205.

After copying the application program encrypted by the additional encryption unit 2218 to the mass storage nonvolatile memory 205, the move control unit 404 erases the to-be-moved application program from the program storage area 406a. Then, the key generation unit 2217 erases the encryption key.

In the second embodiment as described above, the to-be-moved application program is encrypted using the encryption key generated by the key generation unit 2217, and is moved to the mass storage nonvolatile memory 205 after which the encryption key is erased. On account of this, the second embodiment allows the to-be-moved application program to be stored in the mass storage nonvolatile memory 205 at a higher security level as compared with the case of the move method described in the first embodiment.

In the case where the application program stored in the mass storage nonvolatile memory 205 is copied to the RAM 406 for execution, the program acquisition unit 400 acquires the information unique to the host apparatus and then the key generation unit 2217 generates the encryption key using the information unique to the host apparatus, as in the above case. The additional decryption unit 2219 decrypts the application program encrypted by the additional encryption unit 2218, using the encryption key generated by the key generation unit 2217. After the completion of the decryption processing, the move control unit 404 erases the encryption key and then copies the decrypted application program to the RAM 406. The execution unit 409 executes the application program having been copied to the RAM 406.

Also, from the host apparatus 202, the program acquisition unit 400 may acquire information which is unique to a user of the host apparatus and which is given to the host apparatus by the user, the information being a fingerprint of the user, a number specified by the user, or the like. In this case, the key generation unit 2217 generates the encryption key, using the information unique to the user that is given from the host apparatus 202. Here, the key generation unit 2217 can generate the same encryption key at anytime. Thus, when the encryption key becomes unnecessary after the completion of the encryption processing, the encryption key can be erased. This allows the to-be-moved application program to be stored in the mass storage nonvolatile memory 205 at a higher security level as compared with the case of the move method described in the first embodiment.

Third Embodiment

In the first embodiment, the application program downloaded from the service provider is stored in the program storage area 406a of the RAM 406. However, all the application programs may be stored in the mass storage nonvolatile memory 205 when downloaded, thereby reducing the capacity of the RAM 406.

It should be noted here that some or all of the functions of the program acquisition unit 400, the program management unit 401, the history management unit 402, the storage control unit 403, the move control unit 404, the decryption unit 408, the execution unit 409, the reread unit 410, the erase unit 411, the key generation unit 2217, the additional encryption unit 2218, and the additional decryption unit 2219 in the above-described embodiments may be realized by causing the CPU to execute a computer program.

Moreover, some or all of the mass storage nonvolatile memory 205, the program acquisition unit 400, the program management unit 401, the history management unit 402, the storage control unit 403, the move control unit 404, the IC card OS 405, the RAM 406, the public key storage unit 407, the decryption unit 408, the execution unit 409, the reread unit 410, the erase unit 411, the key generation unit 2217, the additional encryption unit 2218, and the additional decryption unit 2219 may be realized by an integrated circuit. To be more specific, all the components mentioned above may be made into one chip, or some of the components may be made into one chip. As the integrated circuit, a Field Programmable Gate Array (FPGA) or a reconfigurable processor may be used.

The memory card of the present invention allows an application program which a TRM area can no longer store to be moved to a mass storage nonvolatile memory at a security level maintained as it was when the application program was downloaded, and thus allows more application programs to be stored in a single memory card. Therefore, the memory card of the present invention is useful as an SD card, an IC card, or the like which requires a well-constructed protection function for application programs.

The invention claimed is:

1. A memory card that receives encrypted application programs from a host apparatus, the encrypted application programs being downloaded to the host apparatus, the memory card comprising:
an Integrated Circuit (IC) card unit configured to have a tamper resistant function; and
a flash memory unit,
wherein the IC card unit includes:
a tamper resistant storage unit;
a program acquisition unit operable to acquire, from the host apparatus, the encrypted application programs and respective sizes of the application programs in encrypted and decrypted forms;
a storage control unit operable to select one of the tamper resistant storage unit and the flash memory unit as a storage location area on the basis of a size of an acquired application program in an encrypted form and a size of free space of the tamper resistant storage unit, and to store the acquired encrypted application program in the selected storage location area;
a move control unit operable to, when the encrypted application program is stored in the tamper resistant storage unit and is to be executed and the size of the application program to be executed in a decrypted form exceeds the size of the free space of the tamper resistant storage unit, move another arbitrary encrypted application program stored in the tamper resistant storage unit to the flash memory unit; and
an execution unit operable to decrypt and execute the application program to be executed.

2. The memory card according to claim 1,
wherein, when the size of the acquired application program in the encrypted form is equal to or smaller than the size of the free space of the tamper resistant storage unit, the storage control unit is operable to store the encrypted application program in the tamper resistant storage unit, and when the size in the encrypted form exceeds the size of the free space, the storage control unit is operable to store the encrypted application program in the flash memory unit.

3. The memory card according to claim 2,
wherein, when the size of the acquired application program in the encrypted form exceeds the size of the free space of the tamper resistant storage unit, the storage control unit is operable to move another arbitrary encrypted application program stored in the tamper resistant storage unit to the flash memory unit.

4. The memory card according to claim 1,
wherein the execution unit is operable to move the encrypted application program to be executed to the flash memory unit after executing the application program.

5. The memory card according to claim 1,
wherein, when the application program to be executed is stored in the flash memory unit and a total of the respective sizes of the application programs to be executed in the encrypted and decrypted forms exceeds the size of the free space of the tamper resistant storage unit, the move control unit is operable to move another arbitrary encrypted application program stored in the tamper resistant storage unit to the flash memory unit and to copy the application program to be executed to the tamper resistant storage unit.

6. The memory card according to claim 1,
wherein, when the application program to be executed is stored in the flash memory unit and the size of the application program to be executed in the decrypted form exceeds the size of the free space of the tamper resistant storage unit, the move control unit is operable to move another arbitrary encrypted application program stored in the tamper resistant storage unit to the flash memory unit, and to store the application program to be executed in the tamper resistant storage unit after decrypting the application program to be executed.

7. The memory card according to claim 1,
wherein the move control unit is operable to generate access history management information for each application program, on the basis of an execution history of the application program, and
the IC card unit further includes a move judgment unit operable to determine which application program is to be moved to the flash memory unit, in accordance with the access history management information.

8. The memory card according to claim 1,
wherein the program acquisition unit is operable to acquire information unique to the host apparatus,
the IC card unit further includes:
a key generation unit operable to generate an encryption key using the acquired information unique to the host apparatus; and
an additional encryption unit operable to encrypt the other arbitrary application program to be moved from the tamper resistant storage unit to the flash memory unit, using the encryption key, and
the move control unit is operable to erase the encryption key after the encryption, and to move the other arbitrary application program which is doubly encrypted with the encryption key to the flash memory unit.

9. The memory card according to claim 8,
wherein the IC card unit further includes:
an additional decryption unit operable to, when the other arbitrary application program stored in the flash memory unit and doubly encrypted with the encryption key is copied to the tamper resistant storage unit, decrypt the other arbitrary application program to be copied using the encryption key generated by the key generation unit, and
the move control unit is operable to erase the encryption key after the decryption, and to store the other arbitrary application program to be copied in the tamper resistant storage unit.

10. A method for a memory card that receives encrypted application programs from a host apparatus, the encrypted application programs being downloaded to the host apparatus, the memory card including an Integrated Circuit (IC) card unit having a tamper resistant function and a flash memory unit, wherein the IC card unit includes a tamper resistant storage unit, the method comprises:
a program acquisition step of acquiring, from the host apparatus and by using a program acquisition unit, the encrypted application programs and respective sizes of the application programs in encrypted and decrypted forms;
a storage control step of selecting, using a storage control unit, one of the tamper resistant storage unit and the flash memory unit as a storage location area on the basis of a size of an acquired application program in an encrypted form and a size of free space of the tamper resistant storage unit, and storing the acquired encrypted application program in the selected storage location area;
a move control step of, when the encrypted application program is stored in the tamper resistant storage unit and is to be executed and the size of the application program to be executed in a decrypted form exceeds the size of the free space of the tamper resistant storage unit, moving using a move control unit another arbitrary encrypted application program stored in the tamper resistant storage unit to the flash memory unit; and
an execution step of decrypting and executing, using an execution unit, the application program to be executed.

11. A non-transitory computer-readable recording medium storing an application holding program for performing a method of holding encrypted application programs for a memory card that receives the encrypted application programs from a host apparatus, the encrypted application programs being downloaded to the host apparatus, the memory card including an Integrated Circuit (IC) card unit having a tamper resistant function and a flash memory unit, wherein the IC card unit includes a tamper resistant storage unit,
the application holding program causing a computer to execute the steps comprising:
a program acquisition step of acquiring the encrypted application programs and respective sizes of the application programs in encrypted and decrypted forms;
a storage control step of selecting one of the tamper resistant storage unit and the flash memory unit as a storage location area on the basis of a size of an acquired application program in an encrypted form and a size of free space of the tamper resistant storage unit, and storing the acquired encrypted application program in the selected storage location area;
a move control step of, when the encrypted application program is stored in the tamper resistant storage unit and is to be executed and the size of the application program to be executed in a decrypted form exceeds the size of the free space of the tamper resistant storage unit, moving another arbitrary encrypted application program stored in the tamper resistant storage unit to the flash memory unit; and
an execution step of decrypting and executing the application program to be executed.

\* \* \* \* \*